(12) United States Patent
Kang

(10) Patent No.: US 12,311,782 B2
(45) Date of Patent: May 27, 2025

(54) METHOD FOR MANAGING BATTERY MISUSE AND APPARATUS FOR PERFORMING THE METHOD

(71) Applicant: aiZEN Global Co., Inc., Seoul (KR)

(72) Inventor: Jung Seok Kang, Seoul (KR)

(73) Assignee: AIZEN GLOBAL CO., INC., Seoul (KR)

( * ) Notice: Subject to any disclaimer, the term of this patent is extended or adjusted under 35 U.S.C. 154(b) by 172 days.

(21) Appl. No.: 18/050,488

(22) Filed: Oct. 28, 2022

(65) Prior Publication Data

US 2024/0092176 A1    Mar. 21, 2024

(30) Foreign Application Priority Data

Sep. 20, 2022 (KR) .................. 10-2022-0118554

(51) Int. Cl.
| | |
|---|---|
| *B60L 3/00* | (2019.01) |
| *B60L 3/04* | (2006.01) |
| *B60Q 9/00* | (2006.01) |
| *H01M 10/42* | (2006.01) |
| *H01M 10/48* | (2006.01) |

(52) U.S. Cl.
CPC .............. *B60L 3/0046* (2013.01); *B60L 3/04* (2013.01); *B60Q 9/00* (2013.01); *H01M 10/48* (2013.01); *H01M 2010/4278* (2013.01); *H01M 2220/20* (2013.01)

(58) Field of Classification Search
CPC .......... B60L 3/0046; B60L 3/04; B60Q 9/00; H01M 10/48; H01M 2010/4278; H01M 2220/20

USPC ........................................................ 701/22
See application file for complete search history.

(56) References Cited

U.S. PATENT DOCUMENTS

| | | | |
|---|---|---|---|
| 2003/0209375 A1* | 11/2003 | Suzuki ................ B60L 58/25 |
| | | | 180/68.5 |
| 2012/0049786 A1* | 3/2012 | Kurimoto ......... H01M 10/4221 |
| | | | 320/106 |
| 2021/0094438 A1* | 4/2021 | Ciccone .............. B60L 58/24 |
| 2022/0120817 A1* | 4/2022 | Okada ................ G01R 31/367 |
| 2022/0123559 A1* | 4/2022 | Stefanopoulou ......... G09B 5/02 |
| 2022/0255148 A1* | 8/2022 | Palatov ............. H01M 10/4257 |
| 2023/0083724 A1* | 3/2023 | Cella ................ G06F 16/24544 |
| | | | 705/28 |

(Continued)

FOREIGN PATENT DOCUMENTS

| | | |
|---|---|---|
| JP | 2021077448 A | 5/2021 |
| KR | 20120102460 A | 9/2012 |
| KR | 20160050977 A | 5/2016 |

(Continued)

OTHER PUBLICATIONS

International Search Report from PCT/KR2023/013255 dated Dec. 8, 2023.

*Primary Examiner* — Yazan A Soofi
*Assistant Examiner* — Ahmed Alkirsh
(74) *Attorney, Agent, or Firm* — Mark T. Vogelbacker; Eckert Seamans Cherin & Mellott, LLC

(57) ABSTRACT

A method of managing a battery misuse and an apparatus for performing the method can include determining, by a battery misuse determination device, the battery misuse. The method can also include disabling, by a battery disabling device, an operation of a battery determined to be the battery misuse.

8 Claims, 16 Drawing Sheets

(56) References Cited

U.S. PATENT DOCUMENTS

2024/0097460 A1* 3/2024 Mai ...................... H02J 7/0048

FOREIGN PATENT DOCUMENTS

| KR | 20210085133 A | 7/2021 |
| KR | 20220050735 A | 4/2022 |

* cited by examiner

METHOD FOR MANAGING BATTERY MISUSE AND APPARATUS FOR PERFORMING THE METHOD

CROSS-REFERENCE TO RELATED APPLICATION

This application claims priority to and the benefit of Korean Patent Application No. 10-2022-0118554, filed on Sep. 20, 2022, the disclosure of which is incorporated herein by reference in its entirety.

1. FIELD OF THE INVENTION

The present invention relates to a method of managing a battery misuse and an apparatus for performing the method. More particularly, the present invention relates to a method of managing a battery misuse for determining the battery misuse when providing services such as electric vehicle-based financial services and stopping the use of the battery when the battery is misused, and an apparatus for performing the method.

2. DISCUSSION OF RELATED ART

Recently, with the rapid development of battery electric vehicle (BEV)-related power electronic technology and battery technology, interest in the development and spread of battery electric vehicles that do not emit carbon dioxide are greatly increasing worldwide.

However, there are still several factors that hinder the spread of the battery electric vehicles. In particular, since an energy density of a battery is not yet sufficiently large, the mileage of battery electric vehicles may not be satisfactorily increased. Therefore, many studies are being actively conducted to increase a charge capacity by increasing the energy density of the battery. Although studies have shown that specifications of batteries for battery electric vehicles are getting higher, when the chargeable capacity of used batteries relative to new batteries reaches a critical capacity (for example, 80%), due to the high requirements for safety and performance of the battery, the batteries are considered waste batteries, and thus, are no longer used in the battery electric vehicles, so the batteries are subject to disposal procedures.

The disposal of the batteries may lead to environmental pollution due to chemicals in the batteries. Since the disposal of the batteries is a waste of enormous resources nationally, a sufficient discussion about the reuse of the batteries is necessary. In addition, since batteries discarded from battery electric vehicles still have a residual capacity value of about 80%, when the batteries are applied to battery electric vehicles with low requirements or the stabilization of output of renewable energy, late-night power use, or the like, which are application fields mainly operating at c-rate of 1 or less, the waste batteries may also secure sufficient economic feasibility.

Therefore, the value of the reuse of the batteries for the battery electric vehicles is increasing, and opportunities to create new and diverse business models, including financial services based on the batteries for the battery electric vehicles, may be provided. In order to reuse the batteries for the battery electric vehicles and trade the batteries for the battery electric vehicles, it is important to determine the value of the battery for the battery electric vehicle. The determination of the value of the battery for the battery electric vehicle may be performed by accurately calculating the capacity and performance of the battery through a diagnostic test.

Various financial products based on batteries for battery electric vehicles are being studied, and financial services may be provided as new financial products. As a related technology, there is Korean patent application 10-2019-0142323.

SUMMARY OF THE INVENTION

An object of the present invention is to solve all of the above problems.

In addition, the present invention is to control a battery when a battery is misused or an electric vehicle-based service is misused based on separate control of the battery while providing an electric vehicle-based service.

Further, the present invention is to reduce illegal use of a vehicle and more effectively conduct an administrative crackdown by banning the illegal driving of the vehicle through battery control, which was impossible with the existing administrative crackdown.

According to an aspect of the present invention, there is provided a method of managing a battery misuse, comprises determining, by a battery misuse determination device, the battery misuse; and disabling, by a battery disabling device, an operation of a battery determined to be the battery misuse.

Meanwhile, wherein the battery misuse determination device determines the battery misuse based on battery misuse determination data, the battery misuse determination data is determined according to a battery misuse determination criterion, and the battery misuse determination criterion includes battery record manipulation, abnormal driving of the battery, an electric vehicle misuse, or disposition of an order to suspend driving of a vehicle from the administrative authority due to violation of an electric vehicle use contract.

Further, wherein the battery disabling device controls to transmit a battery disabling request to an electric vehicle through a wireless network to disable the operation of the battery or controls the electric vehicle to generate a warning sound and a warning message on an instrument panel when the electric vehicle in which the battery misuse occurs is driven.

According to another aspect of the present invention, there is provided a financial service system for managing a battery misuse by being linked with a financial service, the financial service system comprises a battery misuse determination device configured to determine the battery misuse; and a battery disabling device configured to disable an operation of the battery determined to be the battery misuse.

Meanwhile, wherein the battery misuse determination device determines the battery misuse based on battery misuse determination data, the battery misuse determination data is determined according to a battery misuse determination criterion, and the battery misuse determination criterion includes battery record manipulation, abnormal driving of the battery, an electric vehicle misuse, or disposition of an order to suspend driving of a vehicle from the administrative authority due to violation of an electric vehicle use contract.

Further, wherein the battery disabling device controls to transmit a battery disabling request to an electric vehicle through a wireless network to disable the operation of the battery or controls the electric vehicle to generate a warning sound when the electric vehicle in which the battery misuse occurs is driven.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
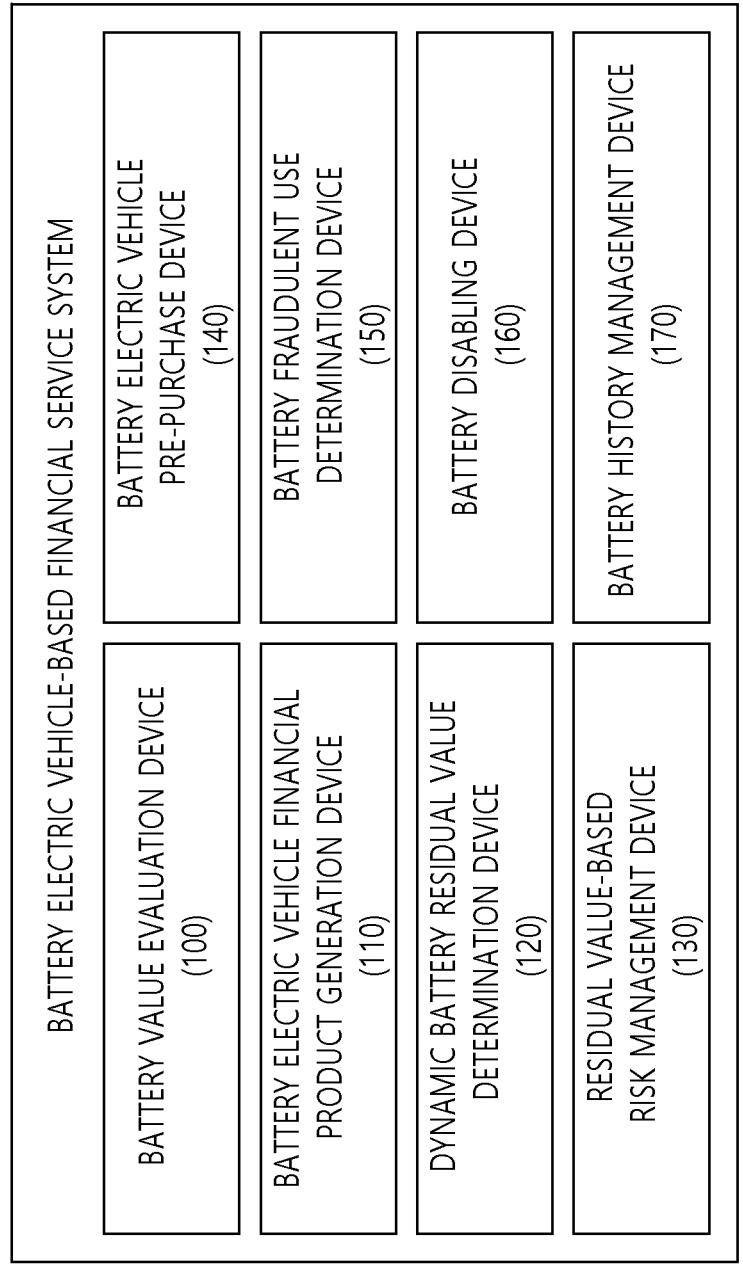
FIG. 1 is a conceptual diagram illustrating a financial service system based on a battery electric vehicle according to an embodiment of the present invention.

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

Hereinafter, for convenience of description, the present invention discloses the provision of a financial service mainly based on a value evaluation of a battery for a battery electric vehicle, but the method of providing a financial service based on the battery electric vehicle itself, which includes the battery for the battery electric vehicle, may be included in the embodiment of the present invention.

In addition, hereinafter, for convenience of description, it is assumed that the battery electric vehicle residual value is determined based on a residual value of a battery for a battery electric vehicle, but the battery electric vehicle residual value may be determined by various factors other than the battery, and these embodiments may also be included in the scope of the present invention.

The battery electric vehicles may be interpreted as including not only four-wheeled vehicles such as electric cars or electric trucks, but also any vehicles that may be operated by batteries such as electric bikes or electric airplanes.

FIG. 1 is a conceptual diagram illustrating a financial service system based on a battery electric vehicle according to an embodiment of the present invention.

FIG. 1 discloses a financial service system for providing a financial service based on a battery electric vehicle.

Referring to FIG. 1, the financial service system includes a battery value evaluation device 100, a battery electric vehicle financial product generation device 110, a dynamic battery residual value determination device 120, a residual value-based risk management device 130, a battery electric vehicle pre-purchase device 140, a battery fraudulent use determination device 150, a battery disabling device 160, a battery history management device 170, and the like.

The battery value evaluation device 100 may be implemented to evaluate a value of a battery. The battery value evaluation device 100 may determine a current value of a battery based on various battery value evaluation methods, such as chemical value evaluation and driving data-based value evaluation.

The battery electric vehicle financial product generation device 110 may be implemented to generate a battery electric vehicle-based financial product. For example, the battery electric vehicle financial product generation device 110 may generate the battery electric vehicle financial product in consideration of the battery electric vehicle residual value predicted based on the battery residual value. The battery electric vehicle financial product is a product such as a lease in selling a battery electric vehicle, and may be generated by considering a credit risk, a residual value risk, an option to return a battery electric vehicle at the time of the expiration of the financial product, and the like, in consideration of battery depreciation. Different battery electric vehicle residual values are set for each financial product, and different monthly payments may be determined according to the set battery electric vehicle residual values.

For example, when a battery electric vehicle residual value is set based on a battery when providing the financial products, there may be a first financial product in which the battery electric vehicle residual value is set to 10 million won considering the depreciation of a battery and a battery electric vehicle and a monthly payment is set to 1 million won (24 million won/24 months) when using a battery electric vehicle worth 34 million won for a period of 2 years, and a second financial product in which the battery electric vehicle residual value is set to 22 million won considering the depreciation of a battery and a battery electric vehicle and a monthly payment is set to 500,000 won (12 million won/24 months) when using a battery electric vehicle worth 34 million won for a period of 2 years. For each of the first financial product and the second financial product, battery electric vehicle return options may be set such as an option for a financial product user to acquire a battery electric vehicle, an option for a financial product user to select whether to return a battery electric vehicle, and an option for a financial product user to return a battery electric vehicle.

The battery electric vehicle financial product generation device 110 may generate and adjust financial products based on a battery electric vehicle residual value (e.g., a market residual value, a strategic residual value, and a standard residual value) in consideration of value evaluation data related to a battery received from the dynamic battery residual value determination device.

The dynamic battery residual value determination device 120 may dynamically determine the battery electric vehicle residual value applied based on the current financial product. The dynamic battery residual value determination device 120 may transmit the information on the dynamically determined battery residual value to the battery electric vehicle financial product generation device 110. The battery electric vehicle financial product generation device 110 may generate a financial product in consideration of a risk of a financial product and a profit (interest rate, etc.) according to the risk of the financial product based on the information on the battery residual value. The dynamic battery residual value determination device 120 may determine the battery residual value based on a data-based determination algorithm such as artificial intelligence and adaptively adjust the battery electric vehicle residual value to generate the financial product in consideration of the battery residual value.

More specifically, the dynamic battery residual value determination device 120 may determine a market residual value based on the value of the battery electric vehicle and/or the value of the battery sold on the market based on the data-based determination algorithm such as artificial intelligence. In addition, the dynamic battery residual value determination device 120 may determine an optimized strategic residual value, a standard residual value, and the like to determine a financial product based on an algorithm such as artificial intelligence. The strategic residual value may be a battery electric vehicle residual value set so that the financial product has a high high risk, and the standard residual value may be a battery electric vehicle residual value set so that the financial product has the lowest risk.

The residual value-based risk management device 130 may be implemented to manage a risk for a financial product after a financial company sells a battery electric vehicle-based financial product. For example, the residual value-based risk management device 130 may manage the risk of the above-described battery electric vehicle-based financial product (e.g., a lease product considering a battery residual value) in real time. Battery value evaluation data (e.g., driving data, etc.) to determine a change in values of batteries corresponding to each of the plurality of financial products is collected, and the risk of the financial product may be adjusted in consideration of the battery electric vehicle residual value (variance residual value) predicted at the time of the expiration of the financial product and the battery electric vehicle residual value (default residual value) assumed when the financial product is generated. The residual value-based risk management device 130 may adjust a loan loss provision according to the risk of the financial product based on the adjustment of the risk of the financial product.

The battery electric vehicle pre-purchase device 140 may be a server related to a futures company (a third party) that pre-purchases a battery electric vehicle related to a financial product sold by a financial company.

The futures company may be a $3^{rd}$ party residual value (RV) guarantor that guarantees a residual value of a vehicle at the time of the expiration of the financial product by a third party, not a financial company.

By guaranteeing the residual value of the futures company, the financial company may avoid a residual price risk when returning a vehicle. When a financial company directly guarantees a residual price, profits or losses may occur depending on a market price during remarketing, but when a third party guarantees a residual price, a financial company may predict a stable profit and loss and establish a product design and a business plan. That is, a financial company may hedge financial risks. In this case, a futures company becomes a risk bearer.

In order to manage the risks, a financial company may sell a battery electric vehicle corresponding to a financial product to a futures company at a certain price before the expiration of the financial product. A futures company may acquire the rights to a battery electric vehicle in advance in consideration of the battery electric vehicle residual value assumed at the time of the expiration of the financial product and the current battery electric vehicle residual value, and trade the battery electric vehicle.

In the case of a financial product that returns a battery electric vehicle, a futures company may have a variable residual value that is an actual battery electric vehicle residual value and is higher than the default residual value which is the battery electric vehicle residual value assumed in a financial product. In this case, a futures company may have a profit equal to a difference between the variable residual value and the default residual value.

In addition, when acquiring a battery electric vehicle according to a penalty option preset for a financial product, a futures company may acquire the battery electric vehicle by depreciating a value from the battery electric vehicle residual value assumed in the financial product. For example, when a financial product is set to a limited mileage (100,000 km), a futures company may request, from a user of a financial product, compensation for a relatively depreciated value according to a penalty option for a battery electric vehicle operated at the limited mileage (100,000 km) or more.

The battery fraudulent use determination device 150 may be implemented to determine battery fraudulent use. The battery fraudulent use determination device 150 may determine whether a battery is used fraudulently by violating a preset condition such as whether the installed battery is replaced or whether the penalty option set for the battery is violated.

Alternatively, the battery fraudulent use determination device 150 may determine whether forgery or tampering with a battery has occurred based on battery history data received from the battery history management device. The battery fraudulent use determination device 150 may automatically determine the number of cases/the number of times in which a battery is turned off after moving to a specific area to prevent car-based crimes (illegal cars (aka burner cars), illegal overseas exports, etc.)

The battery disabling device 160 may be implemented to disable a battery. The battery disabling device 160 may disable the operation of the battery when it is determined that the battery is being used fraudulently. The operation of the battery-based battery electric vehicle may be prevented by blocking a battery from being charged or disabling a battery-based power supply operation through a network.

The battery history management device 170 may be implemented to manage the battery history. The battery history management device 170 may manage battery history (battery electric vehicle driving data, charging data, discharging data, ownership change history, etc.) based on a medium such as a non-fungible token (NFT). The battery history management device 170 may generate authentication data for battery transactions.

The battery fraudulent use determination device, the battery disabling device, and the battery history management device may be implemented as separate management devices for the battery for the battery electric vehicle. When providing the battery electric vehicle-based financial service based on the management of the battery for the battery electric vehicle, the battery may be effectively controlled based on the separate control of the battery when the battery is used fraudulently or the battery electric vehicle-based service is used fraudulently. In addition, by prohibiting the driving of illegal vehicles, which could not be prevented by the existing administrative crackdown, through the battery control, the fraudulent use of a vehicle may be reduced, and the administrative crackdown may be performed more effectively.

Figure 2:
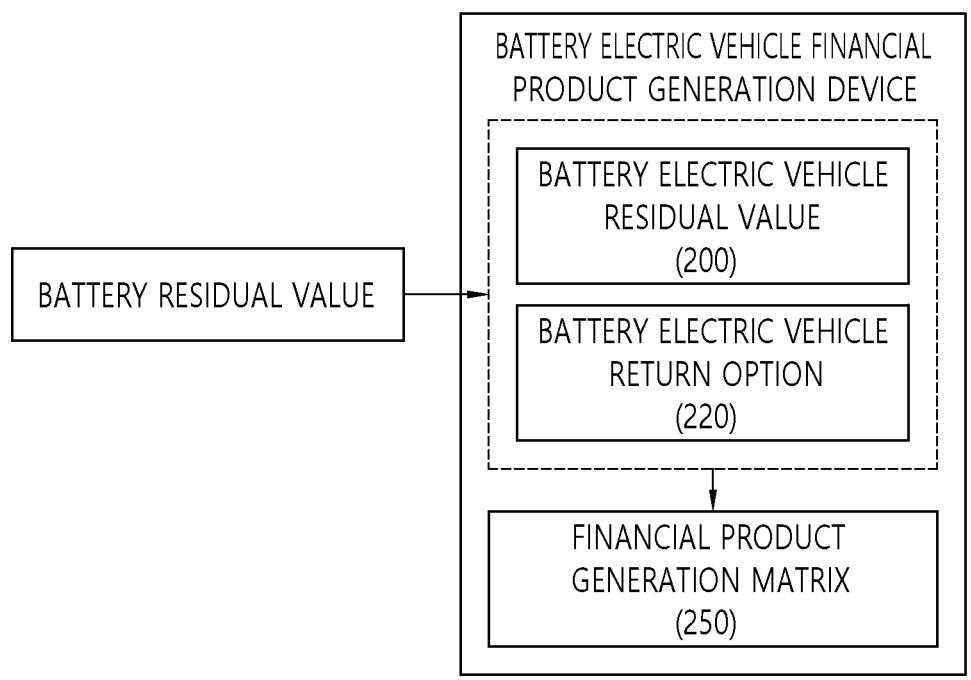
FIG. 2 is a conceptual diagram illustrating an operation of a battery electric vehicle financial product generation device according to an embodiment of the present invention.

FIG. 2 is a conceptual diagram illustrating an operation of a battery electric vehicle financial product generation device according to an embodiment of the present invention.

In FIG. 2, a method of generating a financial product in a battery electric vehicle financial product generation device is disclosed.

Referring to FIG. 2, a financial product generation matrix 250 may be determined based on a set battery electric vehicle residual value 200 and a battery electric vehicle return option 220. For convenience of description, it is assumed that the battery electric vehicle residual value 200 is determined based on the battery residual value.

The financial product generation matrix 250 may be expressed as the term synchronized dynamic residual value (RV) pricing matrix in another expression.

The financial product generation matrix 250 may set the battery electric vehicle residual value 200 differently based on the determination result of the battery residual value of the dynamic battery residual value determination device, and set the battery electric vehicle return option 220 differently to generate financial products with various financial risks.

Table 1 below shows the financial product generation matrix.

TABLE 1

| | No return option* | Return option | Return obligation |
|---|---|---|---|
| Strategic RV (High RV) | No risk | High risk | High high risk |
| Market RV (Neutral RV) | No risk | Medium risk | Medium high risk |
| Standard RV (Low RV) | No risk | Low risk | Low risk |

The financial product generation matrix 250 may have a strategic residual value, a market residual value, and a standard residual value that are related to a battery electric vehicle residual value variable, and may have a battery electric vehicle no return option, a battery electric vehicle return option, and a battery electric vehicle return obligation option that are related to a battery electric vehicle return option variable. The strategic residual value, the market residual value, and the standard residual value may be expressed as the term default residual value when a financial product is generated.

A financial product may be generated by the combination of the battery electric vehicle residual value 200 and the battery electric vehicle return option 220, and according to a financial product, a user pays a monthly payment in consideration of the residual value and uses a battery electric vehicle. For example, when a battery electric vehicle is about 36 million won based on the current selling price, a residual value considering a financial product maturity period (for example, 2 years) is 12 million won, and a financial product using a battery electric vehicle with a 2-year term does not consider interest, a user may use a battery electric vehicle by paying 1 million won per month, which is 24 million won (36 million won–12 million won), for 24 months. After 2 years, a user may pay a residual value of 12 million won according to the battery electric vehicle return option 220 to acquire the battery electric vehicle (battery electric vehicle no return option), determine whether to return or acquire the battery electric vehicle in consideration of a battery electric vehicle residual value on the market (battery electric vehicle return option), or return a battery electric vehicle unconditionally (battery electric vehicle return obligation option).

The strategic residual value is the default residual value, and corresponds to the case where the highest residual value is set. For example, when a battery electric vehicle is 30 million won based on the current selling price, 25 million won may be set to a strategic residual value, and 5 million won excluding the residual value may be paid in monthly installments considering a period (for example, 36 months) of a financial product.

The financial product generated based on the strategic residual value may have different risks depending on the battery electric vehicle return option. The battery electric vehicle no return option does not have a financial product risk because a customer acquires a battery electric vehicle. The battery electric vehicle return option allows the financial product to have a relatively high risk according to a market value of the battery electric vehicle at the time of the expiration of the financial product. The battery electric vehicle return obligation option allows the financial product to have a high high risk according to the market value of the battery electric vehicle at the time of the expiration of the financial product. The financial product with the battery electric vehicle return obligation option may have a relatively higher risk than the financial product with the battery electric vehicle return option.

Similarly, the financial product generated based on the market residual value may have different risks depending on the battery electric vehicle return option. The battery electric vehicle no return option does not have a residual value risk for a financial company because a customer acquires a battery electric vehicle. The battery electric vehicle return option may have a medium risk depending on the market value of the battery electric vehicle at the time of the expiration of the financial product. The battery electric vehicle return obligation option may have a medium risk depending on the market value of the battery electric vehicle at the time of the expiration of the financial product. Since the market residual value is relatively lower than the strategic residual value, it may have a medium high risk depending on the market value of the battery electric vehicle. The battery electric vehicle return obligation option may have a relatively higher risk than the battery electric vehicle return option.

In addition, the financial product generated based on the standard residual value may have different risks depending on the battery electric vehicle return option. The battery electric vehicle no return option does not have a residual value risk for a financial company because a customer acquires a battery electric vehicle. The battery electric vehicle return option may have a relatively low risk depending on the market value of the battery electric vehicle at the time of the expiration of the financial product. The battery electric vehicle return obligation option may have a relatively low risk depending on the market value of the battery electric vehicle at the time of the expiration of the financial product. The standard residual value may have a low risk because the battery electric vehicle residual value is set to be relatively lower than the market residual value.

As described above, for the financial products, interest rates for each financial product may be set differently depending on the risk of the financial product. Hereinafter, in the embodiment of the present invention, a method of calculating a residual value and a method of generating a financial product generation matrix for designing a financial product to reduce the risk of the financial product and to enable a user to make more purchases are disclosed.

Figure 3:
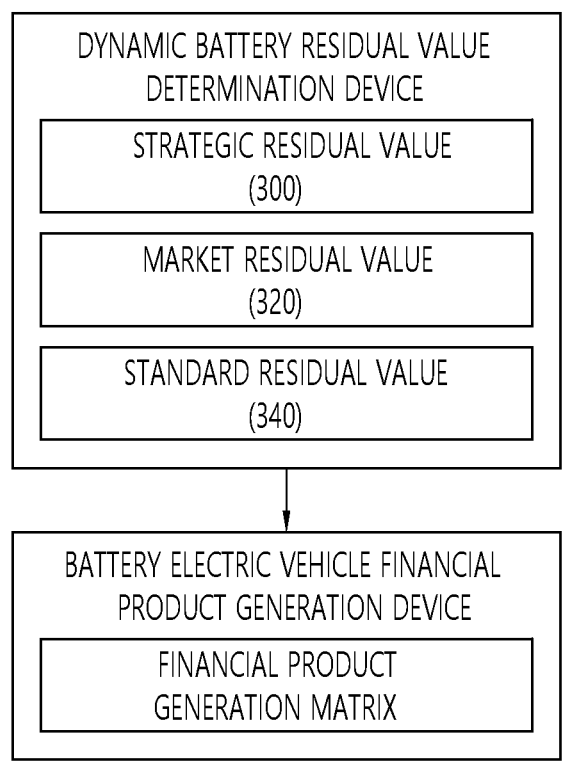
FIG. 3 is a conceptual diagram illustrating a method of calculating a residual value for designing a financial product according to an embodiment of the present invention.

FIG. 3 is a conceptual diagram illustrating a method of calculating a residual value for designing a financial product according to an embodiment of the present invention.

In FIG. 3, a method of calculating a residual value for designing a financial product is disclosed. In particular, the method of calculating a battery electric vehicle residual value based on a battery residual value is disclosed.

Referring to FIG. 3, the battery electric vehicle residual value may be determined to be one of a strategic residual value 300, a market residual value 320, or a standard residual value 340. The dynamic battery residual value determination device may determine the strategic residual value 300, the market residual value 320, or the standard residual value 340 for generating a financial product.

The standard residual value 340 is the lowest residual value and may be a value set to minimize a risk of a financial company. For example, the standard residual value 340 may be determined such that the financial risk of the financial product is less than or equal to a first threshold value in consideration of the market residual value 320.

The market residual value 320 may be a residual value determined based on a market price. For example, battery electric vehicle A may be traded as a used car on the market in consideration of battery electric vehicle depreciation factors such as production year, mileage, supply, etc., of the battery electric vehicle A. The market residual value 320 may be determined based on the expected sales price of the battery electric vehicle on the used car market at the time of the expiration of the financial product in consideration of the market value of battery electric vehicle A as the used car.

The strategic residual value 300 is the highest residual value and may be a value set to maximize a risk of a financial company. For example, the strategic residual value 300 may be determined such that the financial risk is greater than or equal to a second threshold value and less than a third threshold value in consideration of the market residual value 320.

According to the embodiment of the present invention, the standard residual value 340, the market residual value 320, and the strategic residual value 300 may be determined through artificial intelligence-based learning.

Figure 4:
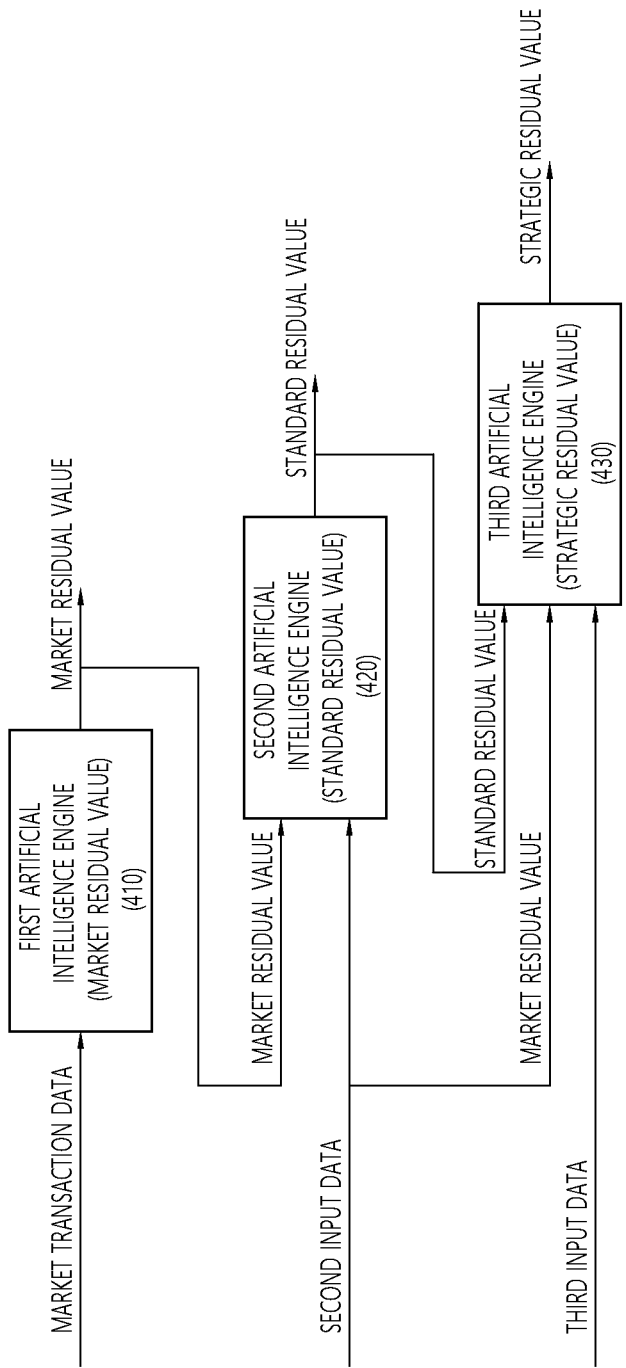
FIG. 4 is a conceptual diagram illustrating a method of calculating a residual value for designing a financial product according to an embodiment of the present invention.

FIG. 4 is a conceptual diagram illustrating a method of calculating a residual value for designing a financial product according to an embodiment of the present invention.

In FIG. 4, an artificial intelligence-based learning method of determining the standard residual value, the market residual value, and the strategic residual value is disclosed.

Referring to FIG. 4, the market residual value may be determined based on market transaction data generated on the market. For the battery electric vehicle A, learning about battery electric vehicle depreciation factors, which affect battery electric vehicle depreciation, such as a driving period and a mileage, and a battery electric vehicle depreciation rate according to the battery electric vehicle depreciation factors can be performed based on used transaction data of the same battery electric vehicle or the most similar battery electric vehicle. Battery electric vehicle depreciation factor data and battery electric vehicle depreciation rate data are input as input data to a first artificial intelligence engine 410 for determining the market residual value, so the training of the artificial intelligence engine for determining the market residual value may be performed.

The standard residual value is a value set for the financial product to have the lowest risk.

A second artificial intelligence engine for determining the standard residual value may be trained based on market residual value data related to the previously sold standard residual value-based financial product and second training data (financial product risk fluctuation data, financial product sales data, risk range data, profit range data, battery electric vehicle acquisition rate data, and standard residual value data). The second training data may be fed back and collected through a sale of a financial product based on the existing standard residual value.

The standard residual value may be determined based on the market residual value data output from the first artificial intelligence engine 410 input to the second artificial intelligence engine 420, and second input data (financial product risk fluctuation data, financial product sales target rate data, risk range data, profit range data, and battery electric vehicle acquisition rate prediction data) set for prediction.

The financial product risk fluctuation data may be data on a fluctuation of risk initially set for financial products that have already been sold. A risk of financial products that have already been generated and sold may fluctuate due to the change in the predicted and set residual value. The fluctuation in financial product risk may be utilized to determine the standard residual value training data.

The financial product sales target rate data may be related to a sales target rate of a financial product determined based on the standard residual value. For example, the battery electric vehicle residual value is set to be relatively high, and thus, as a monthly payment is relatively high, a sales rate of a financial product may be relatively low.

The risk range data may be data on a risk range that a financial product may tolerate.

The profit range data may be data on a profit rate range to be obtained based on the financial product.

The battery electric vehicle acquisition rate prediction data may be data on a rate at which users are predicted to acquire a battery electric vehicle when selling a financial product.

The strategic residual value is a value set for a financial product to have the high high risk.

A third artificial intelligence engine for determining the standard residual value may be trained based on market residual value data and standard residual value data corresponding to the previously sold strategic residual value-based financial product and third training data (financial product risk fluctuation data, financial product sales data, risk range data, profit range data, battery electric vehicle acceptance rate data, and standard residual value data). The third training data may be fed back and collected through a sale of a financial product based on the existing strategic residual value.

The strategic residual value may be determined based on the market residual value data output from the first artificial intelligence engine 410 input to the third artificial intelligence engine 430, the standard residual value data output from the second artificial intelligence engine 420, and the third input data (financial product risk fluctuation data, financial product sales target rate data, risk range data, profit range data, and electric vehicle acquisition rate prediction data) set for prediction.

That is, the three artificial intelligence engines, i.e., the first artificial intelligence engine 410, second artificial intelligence engine 420, and third artificial intelligence engine 430, may interwork to determine the market residual value, the standard residual value, and the strategic residual value for generating the financial product for the battery electric vehicle A.

Figure 5:
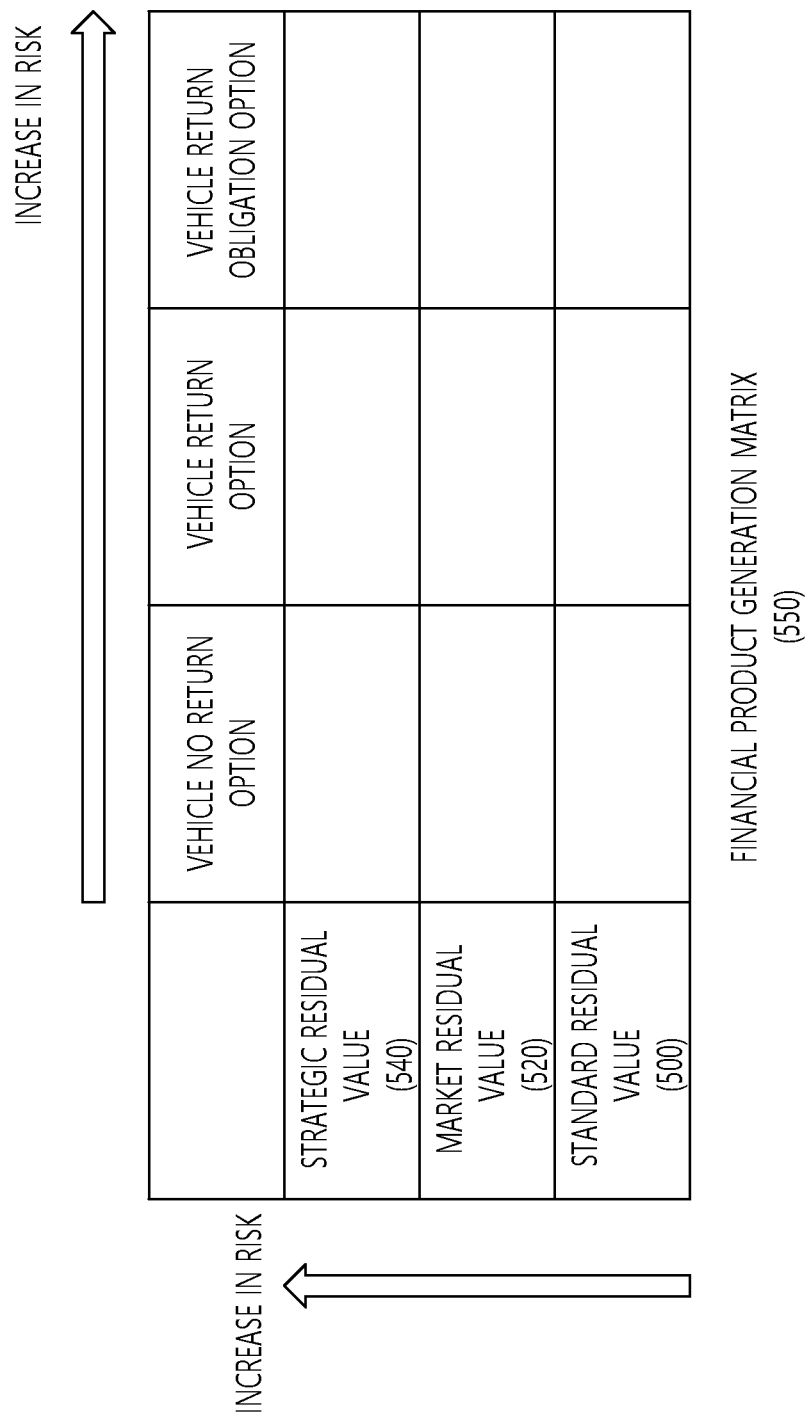
FIG. 5 is a conceptual diagram illustrating a method of generating a financial product generation matrix according to an embodiment of the present invention.

FIG. 5 is a conceptual diagram illustrating a method of generating a financial product generation matrix according to an embodiment of the present invention.

In FIG. 5, a method of generating a financial product generation matrix based on the determined market residual value, standard residual value, and strategic residual value is disclosed.

Referring to FIG. 5, in the financial product generation matrix, a market residual value 520, a standard residual value 500, and a strategic residual value 540 may be determined, and an interest rate and a monthly payment for each product are determined in consideration of the value of the battery electric vehicle. That is, the market residual value 520, the standard residual value 500, and the strategic residual value 540 are adaptively determined according to the determination time, and the financial product matrix 550 may be adaptively changed and generated accordingly.

For example, the case in which the current value of battery electric vehicle A is 36 million won, the market residual value 520 as a financial product with a maturity of 5 years is 20 million won, the standard residual value 500 is 15 million won, and the strategic residual value 540 is 25 million won may be assumed.

For example, in the case of the market residual value 520, interest rate range A is applied to a balance of 16 million won to determine a monthly payment amount, but different interest rates may be set according to the battery electric vehicle return option. For example, the battery electric vehicle no return option, the battery electric vehicle return option, and the battery electric vehicle return obligation option may be set to have an increasing residual value risk for the financial company in this order, and in the interest rate range A, the battery electric vehicle no return option, the battery electric vehicle return option, and the battery electric vehicle return obligation option may be set to have an increasing interest rate in this order.

The standard residual value 500, the market residual value 520, and the strategic residual value 540 have an increasing residual value risk for the financial company in this order, and the battery electric vehicle no return option, the battery electric vehicle return option, and the battery electric vehicle return obligation option have an increasing residual value risk for the financial company in this order The financial product generation matrix may be generated to have a relatively high interest rate as the risk is relatively high by reflecting the risk.

Figure 6:
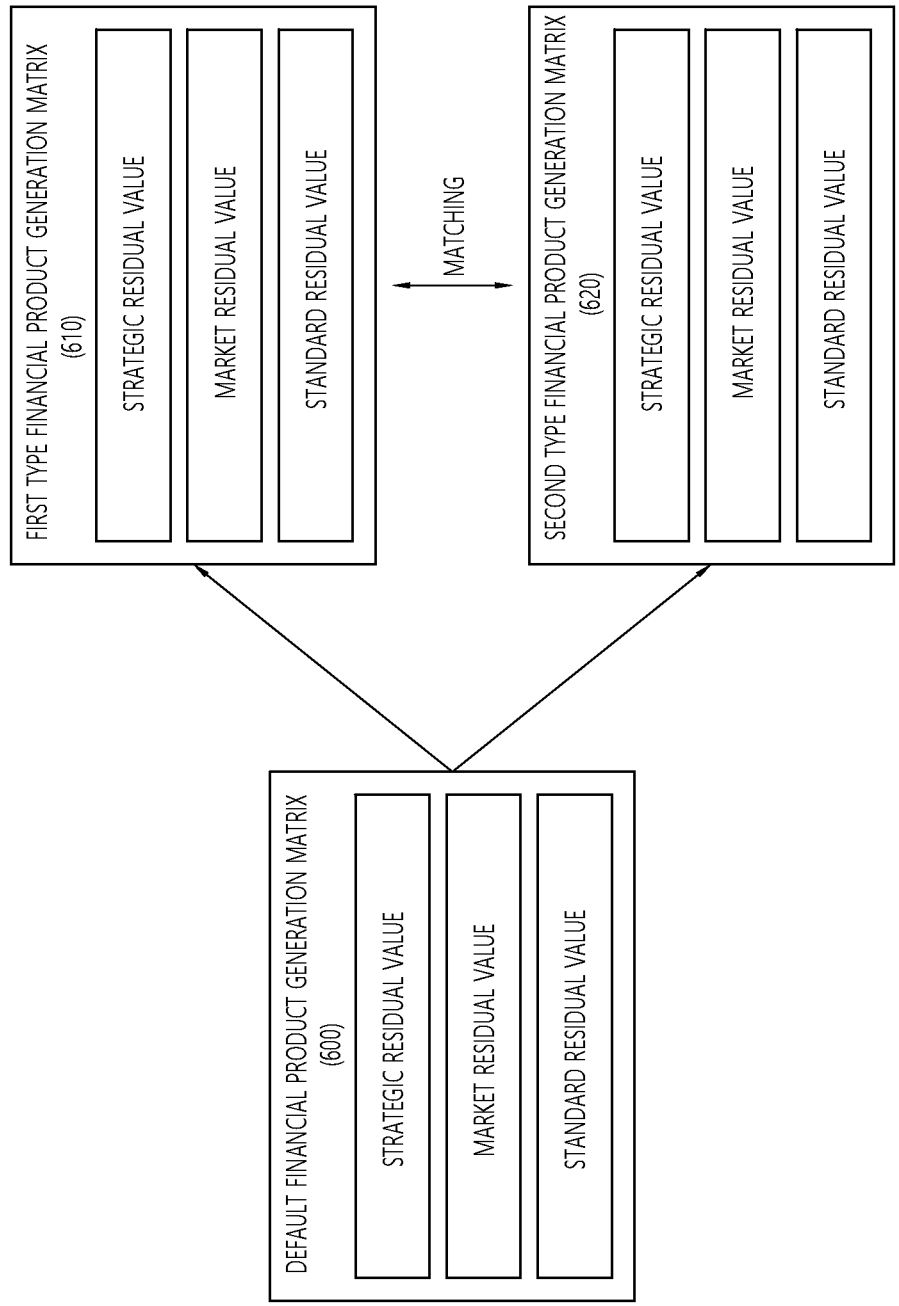
FIG. 6 is a conceptual diagram illustrating a method of generating and adjusting a financial product generation matrix according to an embodiment of the present invention.

FIG. 6 is a conceptual diagram illustrating a method of generating and adjusting a financial product generation matrix according to an embodiment of the present invention.

In FIG. 6, the method of generating and adjusting a financial product generation matrix is disclosed.

Referring to FIG. 6, when a plurality of financial product generation matrices are generated, the financial product generation matrix may be generated and adjusted to enable mutual hedging of financial risks between the financial product generation matrices.

More specifically, a financial product matrix for a popular battery electric vehicle with a relatively high sales volume may be a first type financial product generation matrix 610, and a financial product matrix for a battery electric vehicle with a relatively low sales volume for a battery electric vehicle may be a second type financial product generation matrix 620.

The first type financial product generation matrix 610 and the second type financial product generation matrix 620 are matrices that are mutually matched for financial risk hedging, and may be matched 1:1, 1:many, many:1, and many:many. Accordingly, the sales volume of the battery electric vehicle for determining the first type financial product generation matrix 610 and the second type financial product generation matrix 620 may be set differently.

The first type financial product generation matrix 610 may set the strategic residual value and the market residual value to be relatively low, and the second type financial product generation matrix 620 may set the strategic residual value and the market residual value to be relatively high. A battery electric vehicle corresponding to the first type financial product generation matrix 610 is a relatively popular car model, and even if the residual value is set to be relatively low, a sales volume of the battery electric vehicle may be maintained, and a battery electric vehicle corresponding to the second type financial product generation matrix 620 is a relatively unpopular car model, and even if the residual value is set relatively high, a sales volume of the battery electric vehicle may be maintained.

The first type financial product generation matrix 610 and the second type financial product generation matrix 620 are matched, so the standard residual value, the strategic residual value, and the market residual value may be set to enable mutual hedging.

The first type financial product generation matrix 610 and the second type financial product generation matrix 620 may be matched while being adaptively adjusted based on a user's purchase of a financial product (e.g., a battery electric vehicle lease product).

Initially, all the financial product generation matrices may be set to a default financial product generation matrix 600 to perform the initial product sales, and as they change to the first type financial product generation matrix 610 or the second type financial product generation matrix 620 according to the increase rate of the actual sales volume of the financial product and the reserved sales volume of the financial product, the first type financial product generation matrix 610 or the second type financial product generation matrix 620 may be matched.

Alternatively, according to the embodiment of the present invention, by considering the fluctuation of risk of the financial product generation matrix that changes according to the customer's purchase of a financial product in the default financial product generation matrix 600, the financial product generation matrix in which the financial risk is set to be greater than or equal to a threshold value may be set to the first type financial product generation matrix 610, and the financial product generation matrix in which the financial risk is set to be less than the threshold value may be set to the second type financial product generation matrix 620. The financial risk of the financial product generation matrix may be the sum of financial risks of financial products included in the financial product generation matrix.

The strategic residual value, the market residual value, and the standard residual value at the time of initially generating the default financial product generation matrix may be changed according to the setting of the first type financial product generation matrix 610 or the second type financial product generation matrix 620. That is, the strategic residual value, the market residual value, and the standard residual value of the financial product generation matrix set at the time of initial generation may be changed according to the setting of the first type financial product generation matrix 610 or the second type financial product generation matrix 620.

In addition, the first type financial product generation matrix 610 may be changed to the second type financial product generation matrix 620, the second type financial product generation matrix 620 may be changed to the first type financial product generation matrix 610, and the strategic residual value, the market residual value, and the standard residual value may also be adaptively changed, according to the changes in the actual sales volume of the actual financial product and the reserved sales volume of the financial product.

Figure 7:
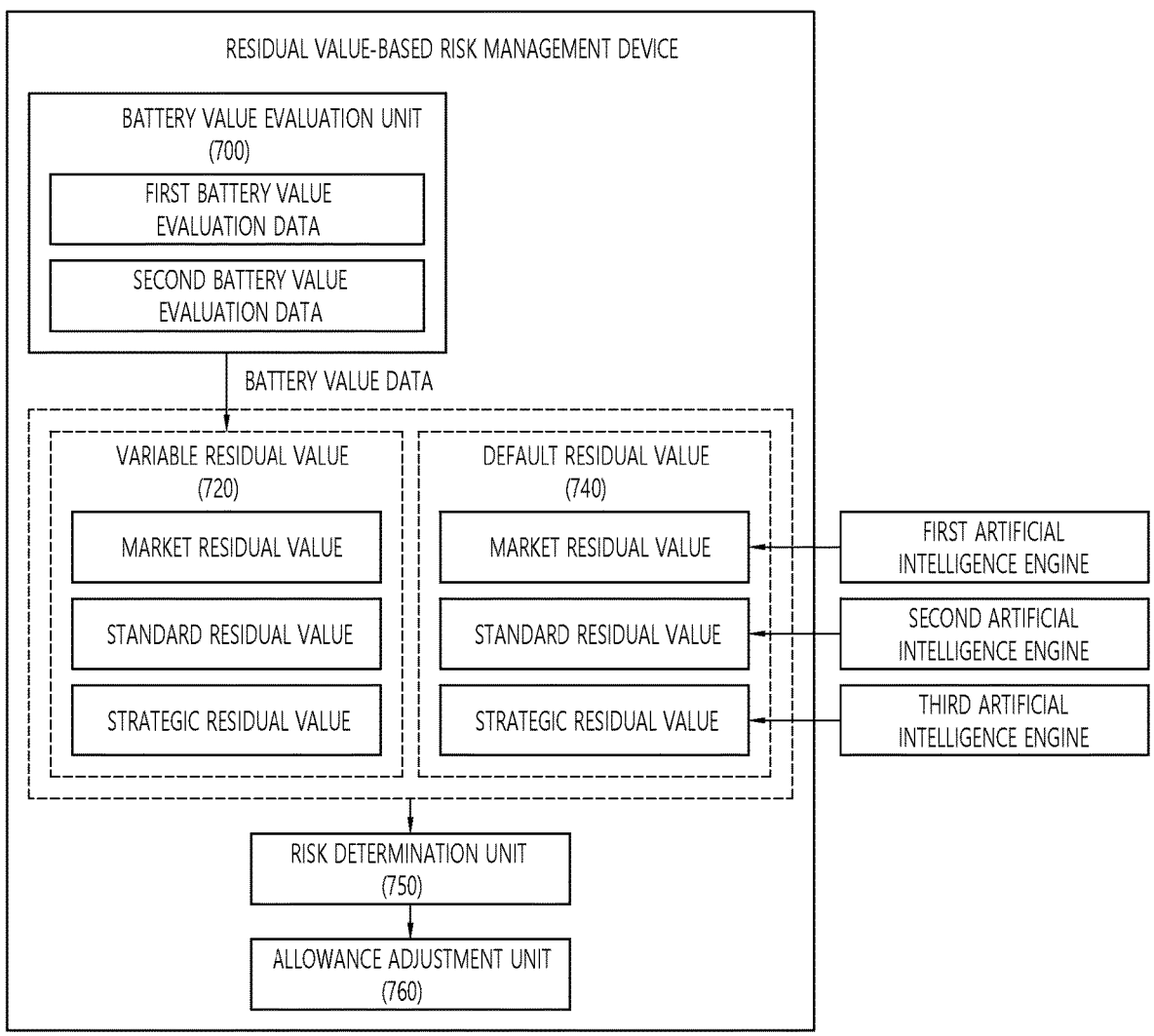
FIG. 7 is a conceptual diagram illustrating an operation of a residual value-based risk management device for managing a risk according to a change in a residual value according to an embodiment of the present invention.

FIG. 7 is a conceptual diagram illustrating an operation of a residual value-based risk management device for managing a risk according to a change in a residual value according to an embodiment of the present invention.

In FIG. 7, a method of managing a risk of a financial product according to a change in a default residual value that is a standard residual value, a market residual value, and a strategic residual value set at the time of generating the financial product is disclosed.

Referring to FIG. 7, the residual value-based risk management device may collect battery value evaluation data (e.g., battery electric vehicle driving data, etc.).

The residual value-based risk management device may adjust the risk of the financial product based on the actual battery electric vehicle operation data in consideration of a battery electric vehicle residual value (hereinafter, a variable residual value 720) predicted at the time of the expiration of the financial product based on the actual battery electric vehicle driving data and a battery electric vehicle residual value (hereinafter, a default residual value 740) assumed at the time of the generation of the financial product.

The default residual value 740 is the market residual value, the standard residual value, and the strategic residual value determined by the above-described first artificial intelligence engine, second artificial intelligence engine, and third artificial intelligence engine.

The variable residual value 720 may be the battery electric vehicle residual value predicted based on the battery value evaluation data after the driving of the battery electric vehicle based on the financial product sales.

In order to determine the variable residual value 720, the value determination may be performed on the battery.

The residual value-based risk management device may include a battery value evaluation unit 700, a risk determination unit 750, and an allowance adjustment unit 760.

The battery value evaluation unit 700 may be implemented for battery value evaluation. The battery value evaluation unit 700 may receive first battery value evaluation data for the battery value evaluation from the battery electric vehicle. In addition, the battery value evaluation unit 700 may receive second battery value evaluation data for the battery value evaluation from an external server. The battery value evaluation unit 700 may determine battery value data based on the first battery value evaluation data and the second battery value evaluation data.

The first battery value evaluation data is battery value evaluation data that is individually generated for each battery electric vehicle, and may include data, which is individually generated according to the driving of the battery electric vehicle, such as battery electric vehicle driving data.

The second battery value evaluation data may be received from the external server as the battery value evaluation data that is not individually generated for each battery electric vehicle. For example, the second battery value evaluation data may include data on external factors, which determine a value of a battery regardless of the battery electric vehicle driving data, such as a change in a battery transaction price, a change in a battery production price, and a change in a raw material price.

The risk determination unit 750 may be implemented to determine a risk based on the battery value data determined by the battery value evaluation unit. More specifically, the risk determination unit 750 may determine a risk that may occur in the financial product based on the difference between the variable residual value 720 and the default residual value 740. When the variable residual value 720 is higher than the default residual value 740, the financial risk may be set to be relatively small. On the other hand, when the variable residual value 720 is lower than the default residual value 740, the financial risk may be set to be relatively large.

The allowance adjustment unit 760 may be implemented to adjust the allowance based on the risk determined by the risk determination unit 750. When the risk is relatively larger than the default risk set at the time of the generation of the financial product, the allowance may be set to increase, and when the risk is relatively smaller than the default risk set at the time of the generation of the financial product, the allowance may be set to decrease.

Figure 8:
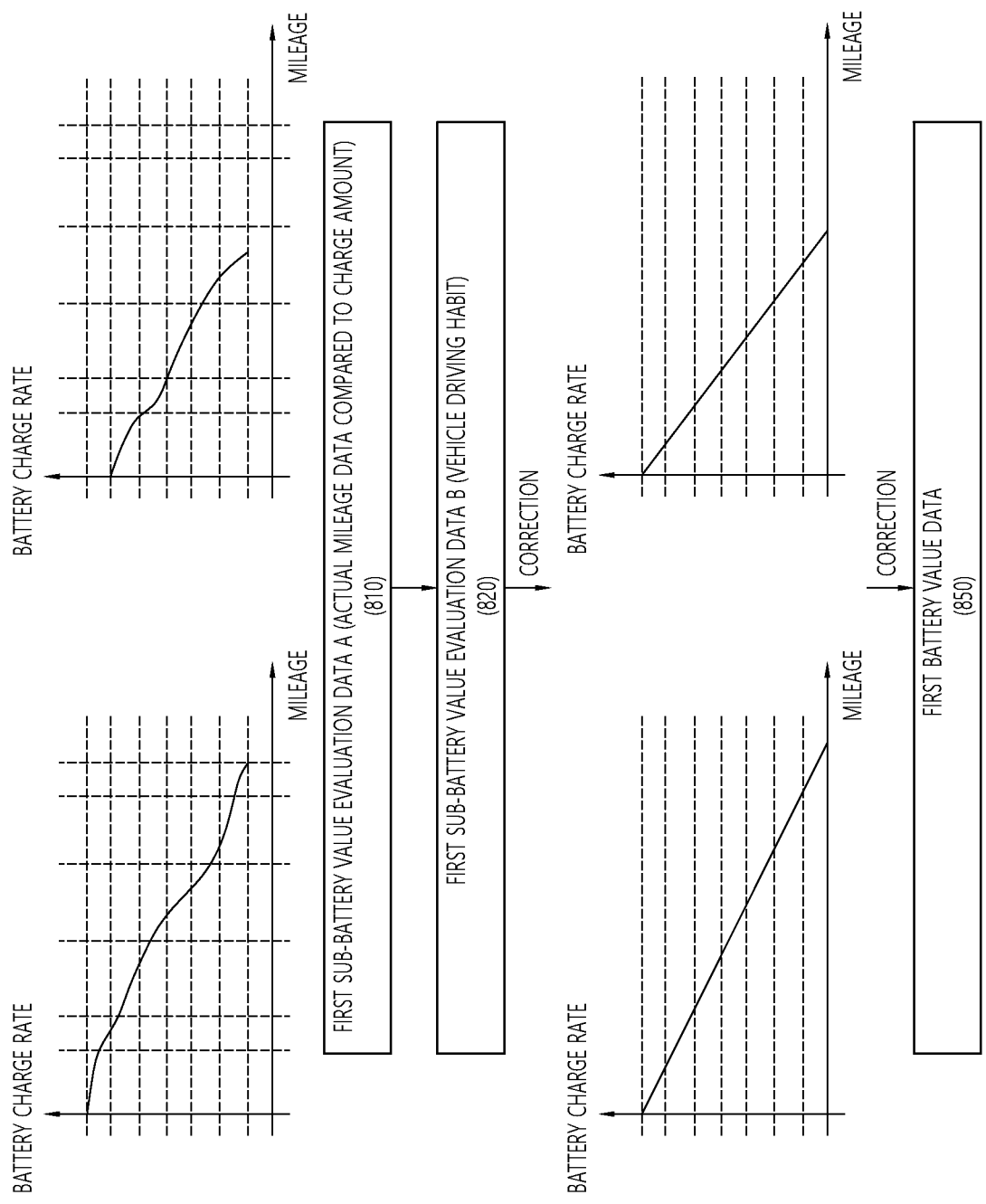
FIG. 8 is a conceptual diagram illustrating a method of determining first battery value data according to an embodiment of the present invention.

FIG. 8 is a conceptual diagram illustrating a method of determining first battery value data according to an embodiment of the present invention.

In FIG. 8, a method of determining first battery value data based on individual battery electric vehicle driving data of a battery electric vehicle is disclosed.

Referring to FIG. 8, first battery value data 850 may be determined based on battery electric vehicle driving data collected from the battery electric vehicle in real time. The battery electric vehicle driving data may include a plurality of pieces of sub-battery electric vehicle driving data as a plurality of pieces of first sub-battery value evaluation data, and the plurality of pieces of first sub-battery value evaluation data may be grouped according to data characteristics and utilized to determine the first battery value data 850.

That is, the first battery value evaluation data for determining the first battery value data 850 may include the plurality of pieces of first sub-battery value evaluation data (first sub-battery value evaluation data A 810 and first sub-battery value evaluation data B 820).

First, data on the actual mileage compared to a charge amount of the battery electric vehicle may be collected as the first sub-battery value evaluation data A 810.

For example, when there is a battery for a battery electric vehicle with a capacity of 80 kWh, data on the mileage based on a charge rate (e.g., 80%) may be collected. The actual mileage compared to the charge amount of the battery electric vehicle may be collected as data that may most intuitively show the deterioration state of the battery. The charge rate may be different for each charging, and the charge rate at which charging is performed may also be different from each other.

Data on a battery electric vehicle driving habit may be collected as the first sub-battery value evaluation data B 820. The data on the battery electric vehicle driving habit may include data on an acceleration change, a speed change, a driving route, and the like of the battery electric vehicle generated during driving. Specifically, in the battery electric vehicle that is the subject of the battery value evaluation, information, which may affect battery discharge, such as charge state information, driving route information, speed change information, acceleration change information, and external environment information of the battery electric vehicle, may be collected as the first sub-battery value evaluation data B 820.

Depending on the battery electric vehicle driving habit, the drivable distance may be changed even with batteries having the same performance. The first sub-battery value evaluation data A 810 may be corrected based on the first sub-battery value evaluation data B 820 to determine the first battery value data 850.

The first battery value data 850 may be determined based on the first sub-battery value evaluation data A 810 and the first sub-battery value evaluation data B 820 collected for each individual battery electric vehicle. The first sub-battery value evaluation data A 810 may be determined for an individual battery electric vehicle, and the first sub-battery value evaluation data B 820 may be collected and determined for a battery electric vehicle driving group instead of an individual battery electric vehicle.

The first battery value data 850 may be determined by correcting the first sub-battery value evaluation data A 810 that is the actual mileage compared to the charge amount based on the sub-battery value evaluation data B 820. After a battery is fully charged to 100% under preset driving conditions, a battery value determination graph determined by correcting the first sub-battery value evaluation data A 810 based on the first sub-battery value evaluation data B 820 may include information on a possible mileage when the battery is discharged to 0%. The value determination of the battery may be determined based on the battery value determination graph, and the first battery value data 850 may be determined.

According to an embodiment of the present invention, the battery value determination graph may be partially changed every time the vehicle is driven, and accordingly, the first battery value data 850 may be changed. Therefore, in the present invention, in order to reduce errors, the current first battery value data 850 may be determined by combining the previously determined first battery value data 850. The battery value should decrease with use, and when the battery value based on the previous first battery value data 850 is greater than the battery value based on the current first battery value data 850, the first battery value data 850 is not used to determine the battery value data, and may be preferentially extracted as exception data. After being extracted as exception data, when exception data more than the threshold number of times and first battery value data 850 within the threshold range are generated adjacent to the exception data, the first battery value data 850 corresponding to the exception data, the exception data generated more than the threshold number of times, and the first battery value data 850 within the threshold range are re-reflected as the value for determining the battery value data, and thus, may be used to determine the battery value data. On the other hand, after being extracted as exception data, when exception data more than the threshold number of times and the first battery value data 850 within the threshold range are generated adjacent to the exception data, the first battery value data 850 corresponding to the exception data may be discarded.

Hereinafter, a correction method of determining the first battery value data 850 and a method of determining the current first battery value data 850 based on the previously determined first battery value data 850 are specifically disclosed.

Figure 9:
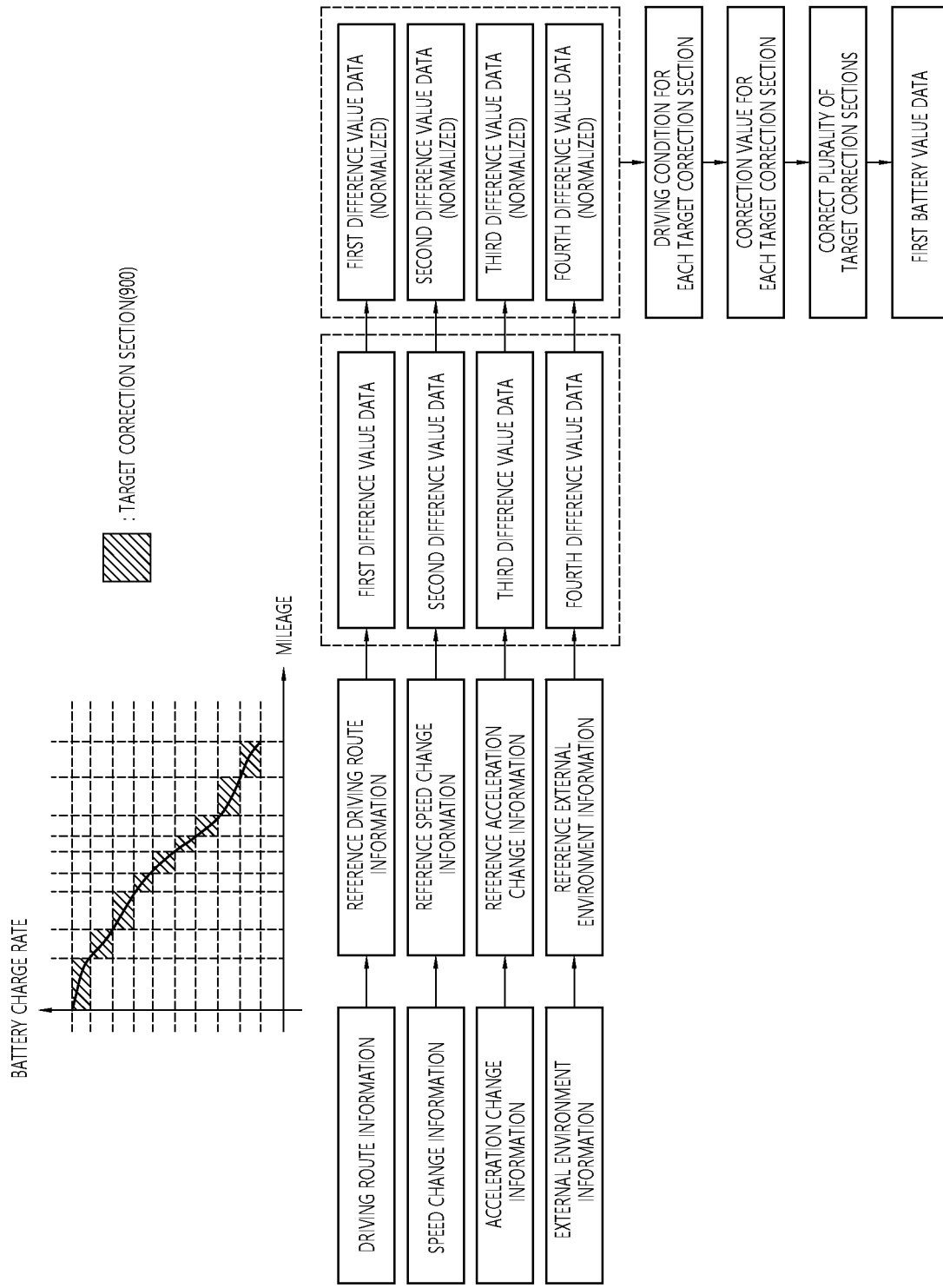
FIGS. 9 and 10 are conceptual diagrams illustrating a method of determining first battery value data according to an embodiment of the present invention.
Figure 10:
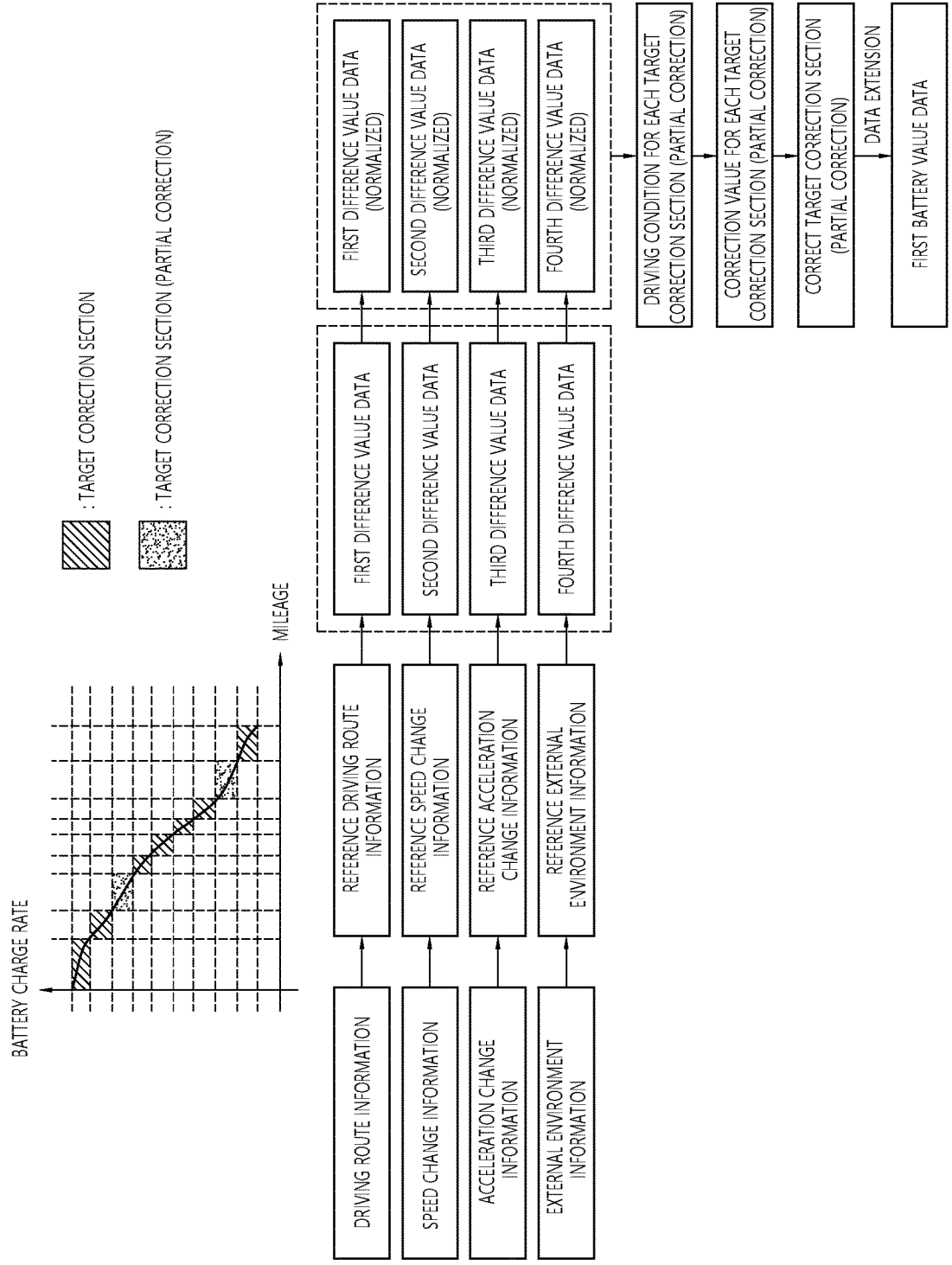

FIGS. 9 and 10 are conceptual diagrams illustrating a method of determining first battery value data according to an embodiment of the present invention.

In FIGS. 9 and 10, a method of determining the first battery value data by correcting the first sub-battery value evaluation data A based on the first sub-battery value evaluation data B is disclosed.

According to the embodiment of the present invention, the first battery value data may be determined based on (1) full correction or (2) partial correction. In FIG. 9, (1) the full correction procedure is disclosed, and in FIG. 10, (2) the partial correction procedure is disclosed.

(1) Full Correction

The sub-battery value evaluation data A, which is the actual mileage data compared to the charge amount, may be primarily divided according to the charge amount section and a threshold value of a mileage change slope. The charge amount section is a section that changes by 10% and may be divided based on a threshold percentage, such as a section where the charge amount is 100% to 90%, a section where the charge amount is 90% to 80%, a section where the charge amount is 80% to 70%, and a section where the charge amount is 70% to 60%, and a plurality of sub-charge amount sections may be generated.

In the present invention, a plurality of sub-charge amount sections may be determined in consideration of ON/OFF of ignition rather than the % reduction in the charge amount. Alternatively, according to an embodiment of the present invention, the charge amount section may be adaptively set differently according to the driving pattern of the battery electric vehicle. As the number of times of long-distance driving increases, a % section set to the sub-charge amount section may be set to be relatively large, and depending on the characteristics of the battery, for a battery having a large change in the battery charge rate, the threshold value of the mileage change slope may be set to be larger. Through this method, different target correction sections may be set for each battery electric vehicle, and more accurate first battery value data may be generated for each battery electric vehicle.

Hereinafter, for convenience of description, a plurality of fixed sub-charge amount sections and a fixed threshold value of a mileage change slope are assumed.

The mileage change slope may be a slope for a change in mileage according to the change in the battery charge rate. The mileage change slope may be smaller in a case of driving 4 km when the charge rate changes by 1% compared to a case of driving 2 km when the battery charge rate changes by 1%.

A mileage section may be divided at a point where the critical mileage change slope is changed to generate a plurality of sub-mileage sections. The critical mileage change slope may be adaptively changed according to setting of the driving conditions to be described below. Different critical mileage change slopes may be generated according to driving conditions, and a critical mileage change slope for determining a plurality of sub-mileage sections may be determined in consideration of the driving conditions.

In the present invention, each of the plurality of divided sub-charge amount sections and the plurality of sub-mileage sections may determine a plurality of target correction sections.

After setting the plurality of target correction sections, the correction may be performed on the first sub-battery value evaluation data A corresponding to each of the plurality of target correction sections.

Each of the driving route information, the speed change information, the acceleration change information, and the external environment information may be considered for correcting the actual mileage data compared to the charge amount in the plurality of target correction sections.

A difference value may be determined based on each of the driving route information, the speed change information, the acceleration change information, and the external environment information, and reference driving route information, reference speed change information, reference acceleration change information, and reference external environment information.

First difference value data for the difference between the driving route information and the reference driving route information, second difference value data for the difference between the speed change information and the reference speed change information, third difference value data between the acceleration change information and the reference acceleration change information, and fourth difference value data for the external environment information and the reference external environment information may be determined.

After the determination of first difference value data, second difference value data, third difference value data, and fourth difference value data, the first difference value data, the second difference value data, the third difference value data, the fourth difference value data may be normalized.

The normalized first difference value data (normalized), the second difference value data (normalized), the third difference value data (normalized), and the fourth difference value data (normalized) may be grouped and determined to be specific driving conditions. In this way, the driving conditions for each of the plurality of target correction sections may be set, and the correction values may be determined differently according to the driving conditions. A method of determining a correction value according to the driving conditions will be described below.

In the above method, each of the entire target correction sections may be corrected, and the first battery value data may be determined based on the corrected mileage for each of the entire target correction sections.

(2) Partial Correction

The partial correction may be performed by considering only the target correction section (partial correction) in which each of the first difference value data (normalized), the second difference value data (normalized), the third difference value data (normalized), and the fourth difference value data (normalized) normalized by being close to the reference driving route information, the reference speed change information, the reference acceleration change information, and the reference external environment information, among all the target correction sections, is within a threshold difference value range.

For example, the case in which each of the first difference value data (normalized), the second difference value data (normalized), the third difference value data (normalized), and the fourth difference value data (normalized) based on the driving route information, the speed change information, the acceleration change information, and the external environment information in target correction section 3 and target correction section 8 is within the threshold difference value range may be assumed.

In this case, the correction value according to the driving condition is determined only for each of the target correction section 3 and target correction section 8, and the first battery value data may be determined based on the extended corrected mileage.

According to the embodiment of the present invention, (1) full correction or (2) partial correction may be selectively used. For example, when the first battery value data of the battery electric vehicle is initially determined, after the full correction is performed n times, the first battery value data may be determined based on the partial correction, but the full correction may be performed only periodically to determine the first battery value data.

Alternatively, when the change in the driving conditions of the battery electric vehicle based on the first sub-battery value evaluation data B of the battery electric vehicle continuously occurs more than a threshold number of times, the initial first battery value data may be re-determined through the full correction again.

When a driving habit or a driving pattern of a driver of a battery electric vehicle is changed, the driving conditions may be changed, and for the change in all the driving conditions, the first difference value data (normalized), the second difference value data (normalized), the third difference value data (normalized), and the fourth difference value data (normalized) may be determined based on the degree of change of the grouped specific driving conditions.

Thereafter, the first battery value data may be determined based on the partial correction, but the full correction may be performed only periodically to determine the first battery value data.

Figure 11:
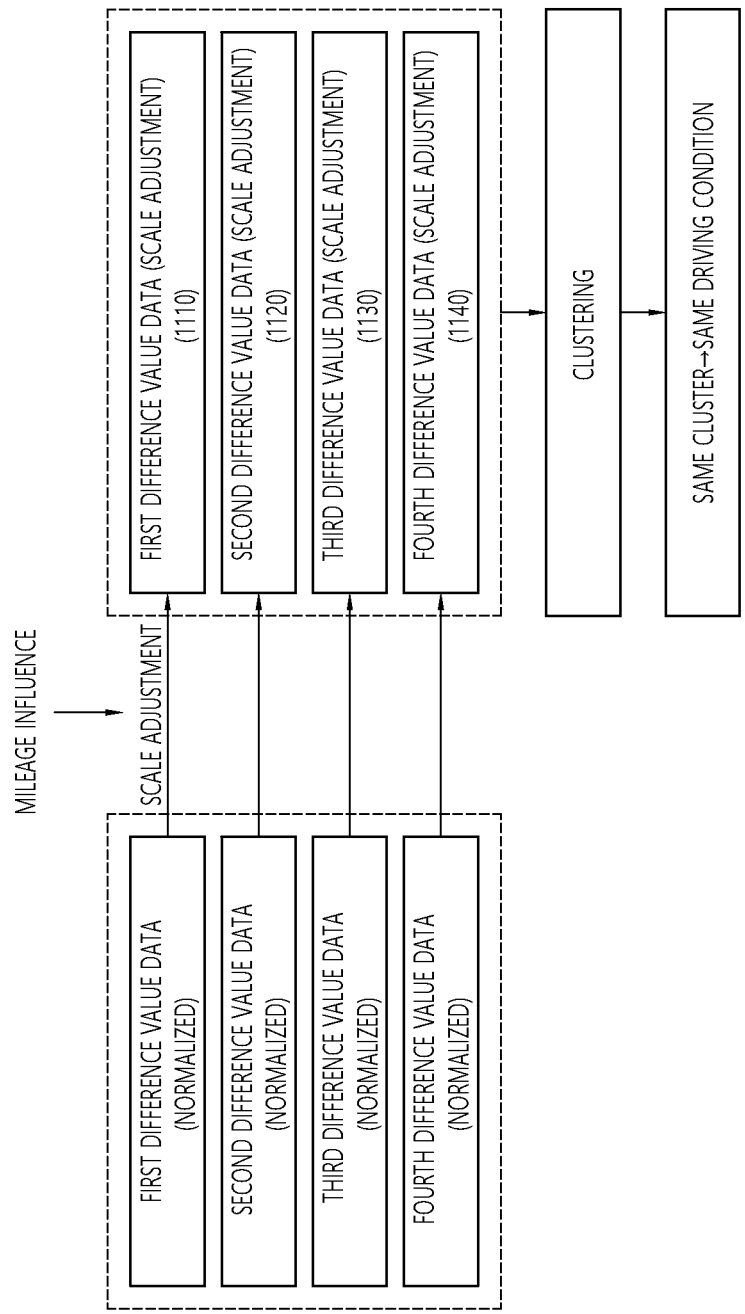
FIG. 11 is a conceptual diagram illustrating a method of determining a driving condition for a target correction section according to an embodiment of the present invention.

FIG. 11 is a conceptual diagram illustrating a method of determining a driving condition for a target correction section according to an embodiment of the present invention.

In FIG. 11, a method of determining a driving condition for a target correction section and determining a correction value according to the driving condition is disclosed.

Referring to FIG. 11, the first difference value data (normalized), the second difference value data (normalized), the third difference value data (normalized), and the fourth difference value data (normalized) may be grouped and determined to be specific driving conditions.

In order to determine the driving conditions corresponding to each of the first difference data (normalized), the second difference data (normalized), the third difference data (normalized), and the fourth difference value data (normalized), the influence of each of the first difference value data (normalized), the second difference data (normalized), the third difference value data (normalized), and the fourth difference value data (normalized) on the mileage may be determined.

Each of the first difference value data (normalized), the second difference value data (normalized), the third difference value data (normalized), and the fourth difference value data (normalized) may be located in a four-dimensional space. The scales of each of the first difference data (normalized), the second difference data (normalized), the third difference data (normalized), and the fourth difference value data (normalized) on the 4D space may be determined in consideration of the influence of each of the first difference value data (normalized), the second difference data (normalized), the third difference value data (normalized), and the fourth difference value data (normalized) on the mileage. That is, the scale of the difference value data (normalized) may be adjusted on the 4D space for clustering in consideration of the mileage influence on the mileage. The mileage influence may be determined based on the influence on the mileage when the remaining difference value data is fixed except for the specific difference value data.

For example, when the first difference data (normalized) has a greater effect on mileage than the second difference data (normalized), the scales on each 4-dimensional space for the first difference data (normalized) may be set to be larger.

In this way, as the degree of influence increases, it is adjusted to be positioned on a four-dimensional space based on a larger scale, first difference value data (scale adjustment) 1110, second difference value data (scale adjustment) 1120, third difference value data (scale adjustment) 1130, and fourth difference value data (scale adjustment) 1140 may be determined based on the scale-adjusted results.

The first difference value data (scale adjustment) 1110, the second difference value data (scale adjustment) 1120, the third difference value data (scale adjustment) 1130, and the fourth difference value data (scale adjustment) 1140 may be clustered, and the same cluster may be determined under the same driving condition.

Hourly driving conditions may be determined for each battery electric vehicle. For example, when driving after the charging, a driving time group of a driver may be determined by collecting the driving time for each driving condition, such as first driving condition x time, second driving condition y time, and third driving condition z time. A degree of change of the specific driving conditions grouped based on the driving condition group may be determined. When driving after the charging, the degree of change in the driving conditions is determined in consideration of each driving condition included in the driving condition group and the ratio of time during which each driving condition is maintained.

For example, when {first driving condition (x time), second driving condition (y time), third driving condition (z time)} is generated, and {first driving condition (x' time), second driving condition (y' time), fourth operating condition (z' time)} is generated, by considering a time ratio between the first driving condition and the second driving condition which are the same driving conditions, a cluster distance between the third and fourth driving conditions which are different driving conditions, and a time ratio between the third driving condition and the fourth driving condition, the degree of change of the driving conditions may be determined.

In addition, according to the embodiment of the present invention, an upper cluster may be formed between different driving conditions according to a setting for quick value determination to enable quick battery value determination.

For example, when driving condition cluster 1 to driving condition cluster n are present, a plurality of adjacent driving condition clusters among the driving condition cluster 1 to the driving condition cluster n may be grouped to form an upper driving condition cluster. For example, the upper driving condition cluster 1 may be determined by grouping the driving condition cluster 1 and the driving condition cluster 3.

The upper driving condition cluster may be used for the partial correction to enable faster correction, and the driving condition cluster may be used for the full correction to enable more detailed battery value determination.

Figure 12:
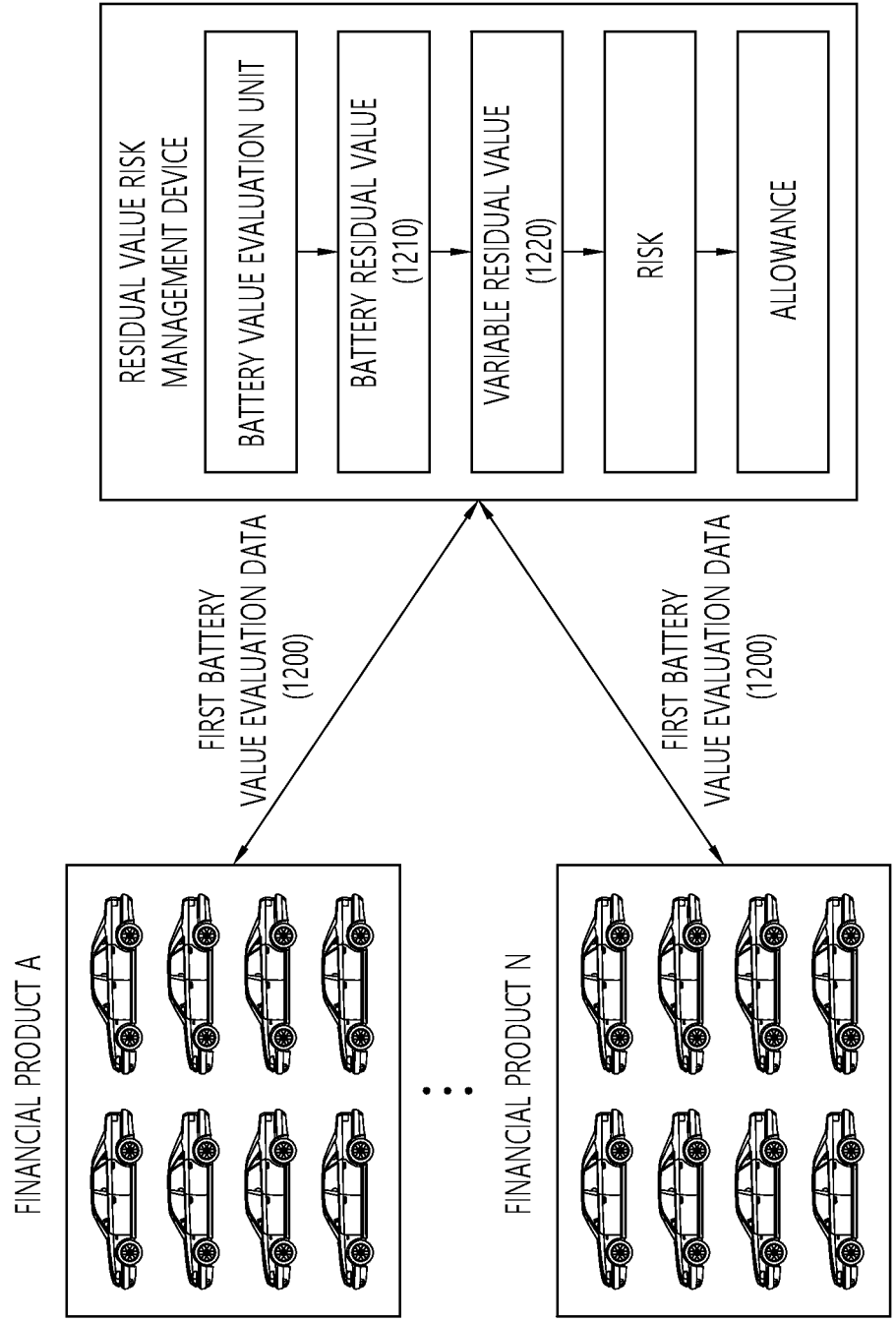
FIG. 12 is a conceptual diagram illustrating an operation of a residual value risk management device according to an embodiment of the present invention.

FIG. 12 is a conceptual diagram illustrating an operation of a residual value risk management device according to an embodiment of the present invention.

In FIG. 12, an operation in which the residual value risk management device performs risk management based on battery value data is disclosed.

Referring to FIG. 12, a plurality of battery electric vehicles corresponding to financial products may generate first battery value evaluation data 1200. The first battery value evaluation data 1200 may include battery electric vehicle driving data. Battery electric vehicle driving data is data that is sequentially generated over time, and may include various types of data that may affect the battery value during the driving of the battery electric vehicle, such as battery electric vehicle speed data, battery electric vehicle mileage data, and battery electric vehicle charging data.

The battery electric vehicle may transmit the first battery value evaluation data 1200 to a battery value evaluation unit in real time based on communication. Each of the plurality of pieces of first sub-battery value evaluation data included in the first battery value evaluation data 1200 may be grouped and transmitted periodically or aperiodically, and thus the value of the current battery can be accurately reflected as much as possible.

The first battery value evaluation data 1200 may include identification information of a corresponding financial product and identification information of a battery electric vehicle.

That is, the residual value risk management device may collect the first battery value evaluation data 1200 of each of the plurality of battery electric vehicles corresponding to a specific financial product that has already been sold, and determine a battery residual value 1210 based on the collected first battery value evaluation data 1200 to determine a variable residual value 1220.

The risk determination unit may determine the variable residual value of the financial product as an average value of the variable residual values 1220 of each of the plurality of battery electric vehicles.

The risk determination unit may adjust the risk of the financial product to be relatively high when the variable residual value is lower than the default residual value. The allowance adjustment unit may adjust the allowance by reflecting the risk adjusted by the risk determination unit.

Figure 13:
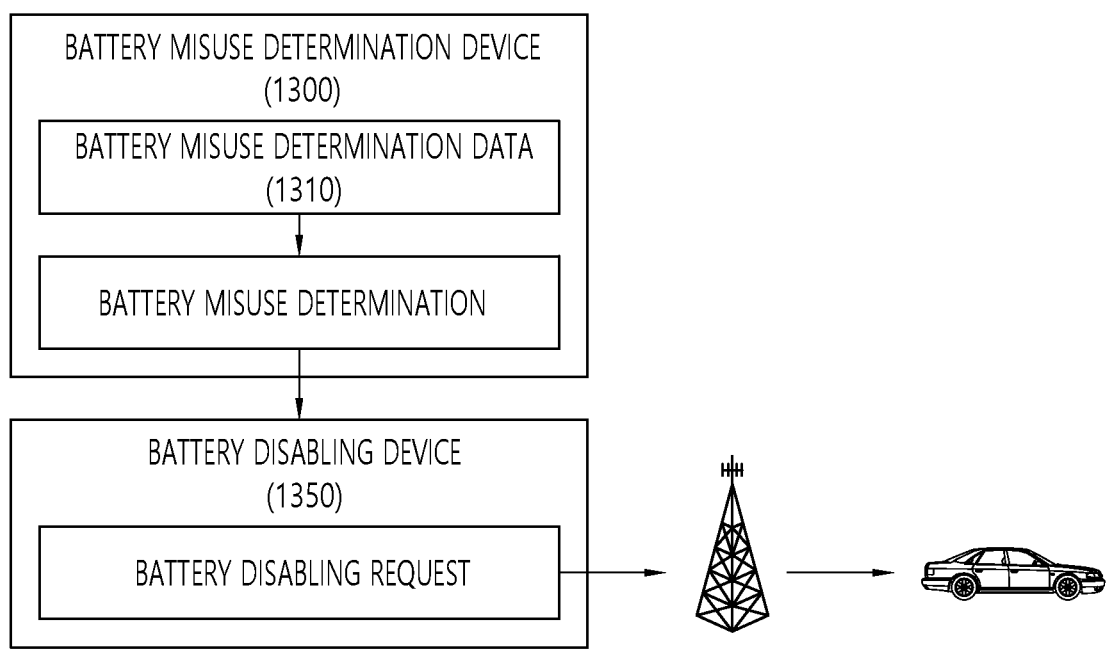
FIG. 13 is a conceptual diagram illustrating operations of a battery misuse determination device and an apparatus for disabling a battery according to an embodiment of the present invention.

FIG. 13 is a conceptual diagram illustrating operations of a battery misuse determination device and an apparatus for disabling a battery according to an embodiment of the present invention.

FIG. 13 illustrates a method of determining a battery misuse by a battery misuse determination device.

Referring to FIG. 13, an apparatus 1300 for determining a battery misuse may determine a battery misuse based on battery misuse determination data 1310. The battery misuse determination data 1310 may be determined according to a battery misuse determination criterion. For example, the battery misuse determination criterion may include battery record manipulation, abnormal driving of a battery, an electric vehicle misuse (e.g., a vehicle illegally registered, a tax delinquent electric vehicle, etc.), or disposition of an order to suspend driving of a vehicle from the administrative authority due to violation of electric vehicle use contracts.

The apparatus 1300 for determining a battery misuse may manage the battery based on a medium such as the non-fungible token (NFT) to determine whether the battery record has been manipulated, and perform the determination on whether the battery has been counterfeited or tampered.

In addition, the apparatus 1300 for determining a battery misuse may determine whether there is a possibility of an electric vehicle-based crime such as when a battery is switched to an OFF state after moving to a specific area (e.g., a port) to determine the abnormal driving of the battery. The apparatus 1300 for determining a battery misuse may perform a determination to prevent a criminal act, such as illegally exporting an electric vehicle after moving the electric vehicle to an area such as a port.

In addition, the apparatus 1300 for determining a battery misuse may also determine that a battery is misused even for an electric vehicle that is determined to have been illegally used based on electric vehicle management data acquired from the external server.

In addition, the apparatus 1300 for determining a battery misuse may determine whether an electric vehicle use contract has been violated. For example, when monthly payments for electric vehicles using financial services are overdue, debts for the electric vehicles are defaulted, violations (e.g., battery removal/exchange/contracted mileage, etc.) of contract terms for the electric vehicles occur, the apparatus for determining a battery misuse may be determined as the battery misuse.

A battery disabling device 1350 may be implemented to disable the battery when the battery misuse is determined by the apparatus 1300 for determining a battery misuse. The battery driving of the electric vehicle may be remotely controlled ON/OFF. The battery disabling request may be transmitted to the communication unit of the electric vehicle through a wireless network. When the battery disabling request is received, a battery is disabled, the supply of power by the battery stops according to the battery disabling, and the electric vehicle may not driven.

When the battery misuse occurs, the battery disabling device 1350 may provide an alarm to the outside in the form of an alarm. When the electric vehicle in which the battery misuse occurs is driven, a warning sound (a beep sound or a sound indicating that an electric vehicle is an electric vehicle in which a battery misuse occurs) may be output, so it may notify that the battery of the corresponding electric vehicle is misused. In addition, it is possible to warn a driver by displaying an illegal use warning message on an instrument panel of the electric vehicle.

Figure 14:
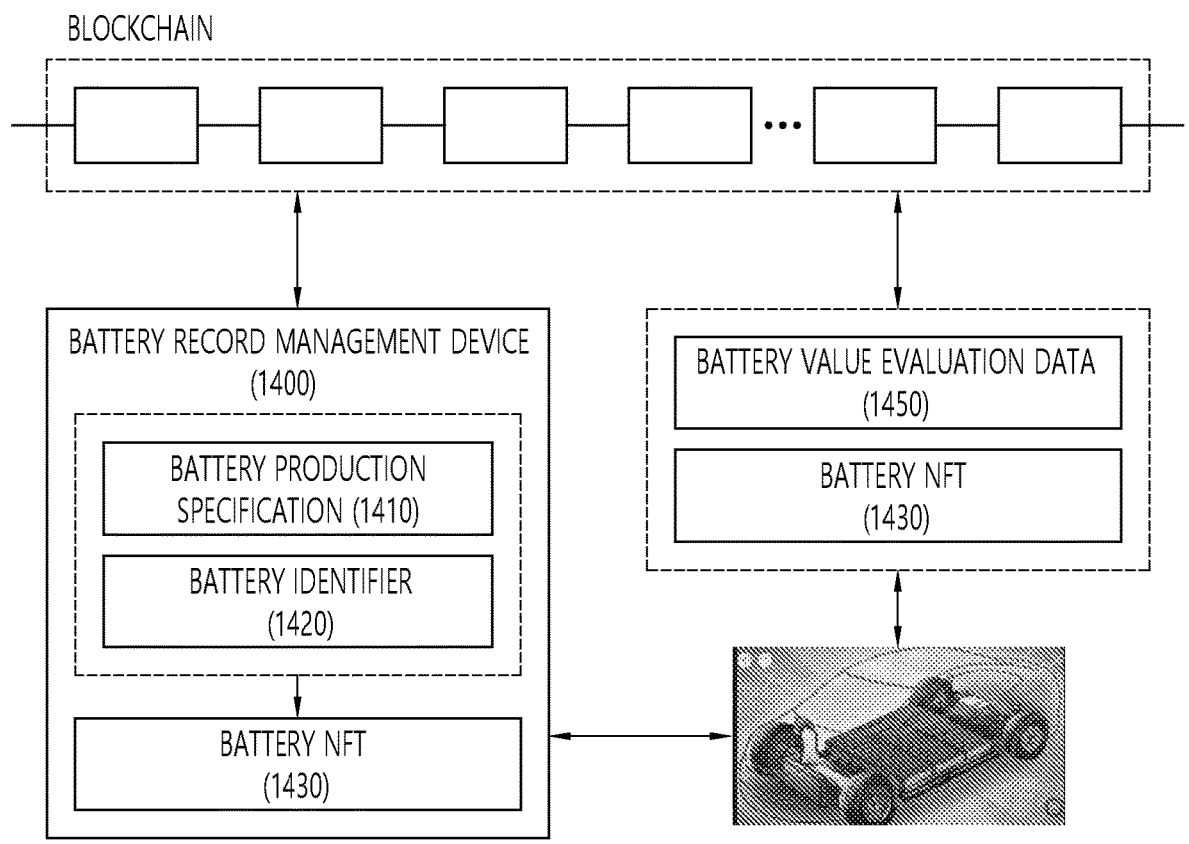
FIG. 14 is a conceptual diagram illustrating a method of managing a battery record based on NFT according to an embodiment of the present invention.

FIG. 14 is a conceptual diagram illustrating a method of managing a battery record based on NFT according to an embodiment of the present invention.

Referring to FIG. 14, a method of managing a battery record by a battery record management device is disclosed.

Referring to FIG. 14, a battery record management device 1400 may manage a battery record based on NFT on a blockchain.

When a battery is produced, a battery NFT 1430 may be issued on a blockchain based on a battery production specification 1410 and a battery identifier 1420. The battery NFT 1430 may move to a blockchain wallet of a battery owner (when a purchaser of an electric vehicle purchases a battery together, the purchaser of the electric vehicle).

When a battery is installed in an electric vehicle and the electric vehicle is driven based on the battery, the battery value evaluation data (e.g., electric vehicle driving data, etc.), which is data that may affect a battery value, is linked with and stored in the battery NFT 1430 on the blockchain.

That is, the battery value evaluation data corresponding to the battery NFT may be recorded in a block on the blockchain by generating a transaction. The battery value evaluation data corresponding to the battery NFT may be generated and managed based on the battery NFT.

The battery value evaluation data may be stored on the blockchain in different formats depending on the purpose.

The battery value evaluation data (first format) is data that is to be collected as first battery value evaluation data of each of a plurality of electric vehicles extracted from a plurality of electric vehicles corresponding to a financial product and corresponding to a specific financial product already sold. The battery value evaluation data (first format) may include, as header information, financial product identification information and battery identification information corresponding to a battery, and battery NFT information. The battery value evaluation data (first format) may be classified based on financial product identification information and used to determine the above-described variable residual value.

The battery value evaluation data (second format) may be battery value evaluation data extracted from one electric vehicle corresponding to an individual financial product. The battery value evaluation data may include, as the header information, the battery identification information, the battery owner information, and the battery NFT information. The battery value evaluation data (first format) and the battery value evaluation data (second format) may be generated at different points in time and stored on the blockchain.

Figure 15:
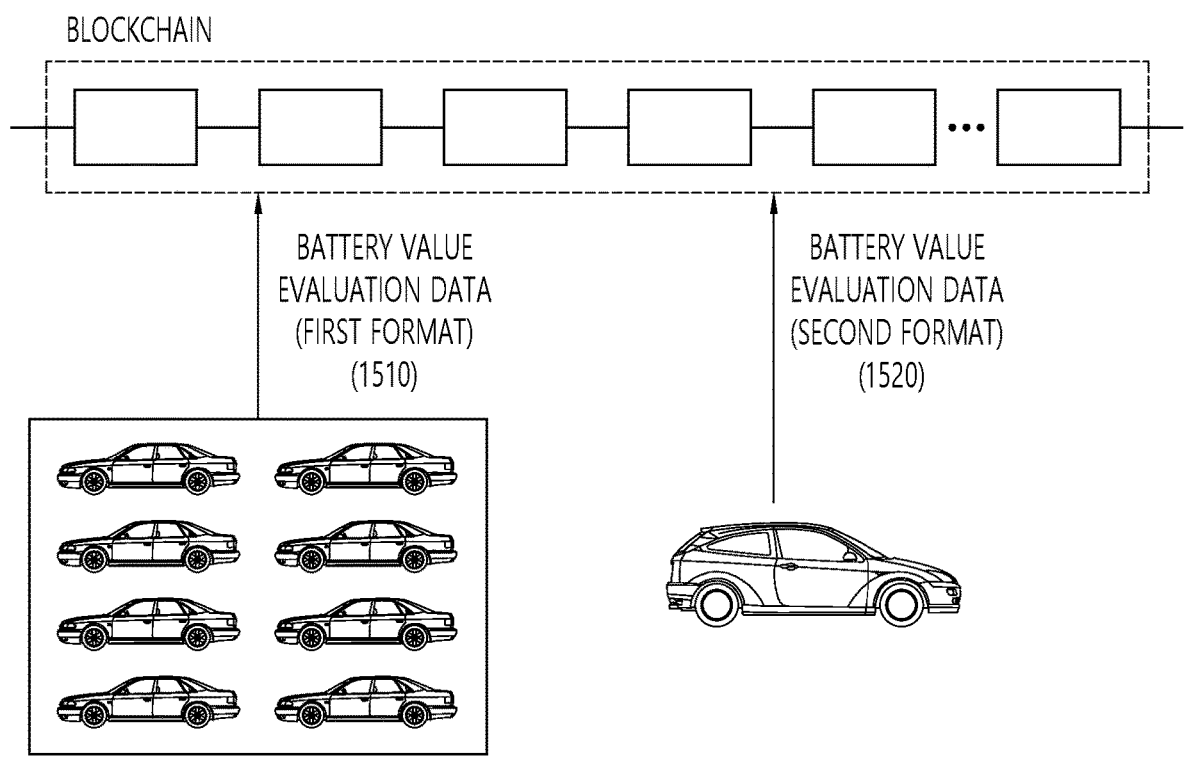
FIG. 15 is a conceptual diagram illustrating a method of recording battery value evaluation data on a blockchain according to an embodiment of the present invention.

FIG. 15 is a conceptual diagram illustrating a method of recording battery value evaluation data on a blockchain according to an embodiment of the present invention.

FIG. 15 illustrates a battery record management method based on the battery value evaluation data (first format) and the battery value evaluation data (second format).

Referring to FIG. 15, battery value evaluation data (first format) 1510 and battery value evaluation data (second format) 1520 may be generated in consideration of driving information, and may be collected and transmitted on a blockchain by setting a valid period.

The battery value evaluation data (first format) 1510 may be delivered at periods set for each financial product. For example, when there are 1000 electric vehicles related to financial product A, the financial product A may receive the battery value evaluation data (first format) 1510 from 1000 electric vehicles, respectively, on a weekly basis. The variable residual value may be determined based on the battery value evaluation data (first format) 1510 received from 1000 electric vehicles, and the risk of the financial product may be adjusted through comparison between the variable residual value and the default residual value.

Alternatively, the battery value evaluation data (first format) 1510 may be delivered according to set conditions for each financial product. The battery value evaluation data may also be generated under specific conditions (e.g., 1000 km driving unit) based on electric vehicle driving data according to smart contracts and stored on the blockchain.

In addition, the valid period of the battery value evaluation data (first format) 1510 may be set according to cycles set for each financial product. Only the battery value evaluation data (first format) 1510 within the valid period may be utilized to determine the risk of a financial product.

The valid period of the battery value evaluation data (first format) 1510 may be adjusted according to the driving of the electric vehicle. For example, the valid period of the battery value evaluation data (first format) 1510 may be set to be relatively short as the driving of the electric vehicle is relatively large, and the valid period of the battery value evaluation data (first format) 1510 may be set to be relatively long as the driving of the electric vehicle is relatively small. That is, the valid period of the battery value evaluation data (first format) 1510 for each electric vehicle may be set differently based on previous electric vehicle driving data.

In addition, the battery value evaluation data (first format) 1510 may be periodically transmitted, but a transmission point in time of the battery value evaluation data (first format) 1510 may be different for each electric vehicle. In order to adjust the risk of a financial product, the battery value evaluation data (first format) 1510 outside the valid period may be adjusted based on existing electric vehicle driving data.

The battery value evaluation data (second format) 1520 may be transmitted according to a direct transmission request for the battery value evaluation data (second format) 1520 or may be transmitted according to cycles set for each electric vehicle. The battery value evaluation data (second format) 1520 may be generated and transmitted when an owner changes.

The transmission period of the battery value evaluation data (second format) 1520 may be set so as not to overlap with the transmission of the battery value evaluation data (first format) 1510, and when the transmission period of the battery value evaluation data (second format) 1520 is included within the valid period of the battery value evaluation data (second format) 1520, the battery value evaluation data (second format) 1520 may not be transmitted.

Figure 16:
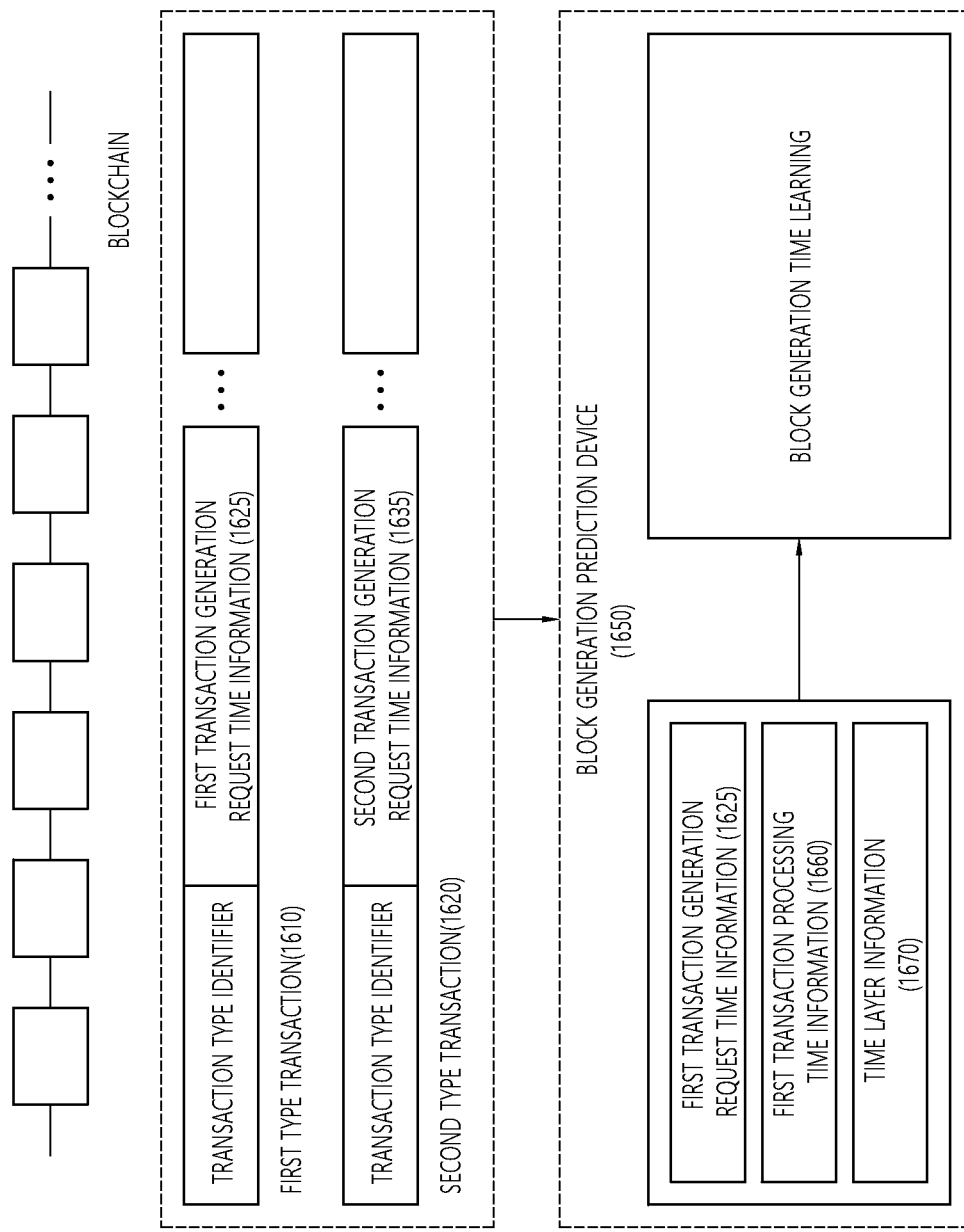
FIG. 16 illustrates a method of transacting battery-related information on a blockchain according to an embodiment of the present invention.

FIG. 16 illustrates a method of transacting battery-related information on a blockchain according to an embodiment of the present invention.

FIG. 16 illustrates a method of adaptively adjusting a block generation time when battery NFTs and battery value evaluation data are transacted on a blockchain.

Referring to FIG. 16, a plurality of battery transaction record management nodes may be present to generate a block on a blockchain.

In the present invention, records of transactions generated on the blockchain are collected for each time period, and a block generation time may be adaptively determined for each time period based on the transaction records.

The transaction may be classified into two types. A first type transaction 1610 is a transaction that is relatively sensitive to a block generation time and may be transaction when generation of the battery the value evaluation data (first format) or the battery value evaluation data (second format) is required in a critical period of time as when data processing needs to be quickly performed.

The second type transaction 1620 may be transaction in which the block generation time is relatively insensitive. The second type transaction 1620 may be transaction when the generation of the battery value evaluation data (first format) or the battery value evaluation data (second format) is not required within a critical period of time.

The block generation time prediction device 1650 may predict the block generation time based on the generated transaction. The block generation time prediction device 1650 may filter the second type transaction 1620 and extract the first type transaction 1610 to perform learning for predicting the block generation time.

The first type transaction 1610 may include a transaction type identifier indicating the first type transaction 1610 and a first transaction generation request time information 1625 for a time required to generate the battery value evaluation data (first format) or the battery value evaluation data (second format).

The first transaction generation request time information 1625 may include processing request time information that requests the generation of the first type transaction 1610, and limit time information that is information on a limit time for requesting delivery of transaction indicating that the transaction cannot be processed when the generation of the first type transaction 1610 is impossible until a specific point in time.

The second type transaction 1620 may include a transaction type identifier indicating the second type transaction 1620 and second transaction generation request time information 1635 for a time required to generate the battery value evaluation data (first format) or the battery value evaluation data (second format).

The second transaction generation request time information 1635 may include only limit time information that is information on a limit time for requesting delivery of transaction indicating that the transaction cannot be processed when the generation of the second type transaction 1620 is impossible until a specific point in time.

The block generation time prediction device 1650 may hierarchically divide the transaction generation time to predict the transaction processing time and perform learning on a volume of transaction generated by time.

The block generation time prediction device 1650 may perform learning for predicting a block generation time based on the block generation time when the first type transaction 1610 and the second type transaction 1620 occur.

The block generation time prediction device 1650 may include the first type transaction 1610 and first type transaction processing time information 1660 to perform the learning for predicting the block generation time.

The block generation time determination device 1650 may perform learning based on the first transaction generation request time information 1625, and first type transaction processing time information 1660, and time layer information 1670 that are included in the first type transaction. The time layer information 1670 is information in which time units are layered, and may be used to perform block generation in consideration of time sensitivity of block generation time by layering time units.

A first time layer may be a second unit as a smallest time unit, a second time layer may be a minute unit, and a third time layer may be an hour unit. Through the setting of these time layers, learning for a block generation time based on sensitivity in the second unit, learning for a block generation time based on sensitivity in the minute unit, and learning for a block generation time based on sensitivity in the hour unit may be performed.

The block generation time prediction device 1650 may set time sensitivity (sensitivity in the second unit, sensitivity in the minute unit, and sensitivity in the hour unit) and may generate a block based on the learned result so that the block generation time is less than or equal to a critical block generation time. For example, when the block generation time prediction device 1650 sets the time sensitivity to the sensitivity in the second unit, the block generation time prediction device 1650 may generate a block so that the block generation time is less than equal to the critical block generation time in the sensitivity in the second unit.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

What is claimed is:

1. A method of managing a battery misuse by stopping use of a battery of an electric vehicle when the battery is misused, comprising:

managing, by a battery record management device, a battery record based on non-fungible token (NFT) on a blockchain, wherein the NFT is issued on the blockchain based on a battery production specification and a battery identifier when the battery is produced;

determining, by a battery misuse determination device, the battery misuse based on battery misuse determination data according to a battery misuse determination criterion including battery record manipulation, abnormal driving of a battery, an electric vehicle misuse, or disposition of an order to suspend driving of the electric vehicle from an administrative authority due to violation of an electric vehicle use contract;

controlling remotely, by a battery disabling device, battery driving of the electric vehicle;

transmitting, by the battery disabling device, a battery disabling request to the electric vehicle through a wireless network to disable operation of the battery; and disabling, by a battery disabling device, an operation of a battery determined to be the battery misuse by stopping power supply from the battery to the electric vehicle based on the battery disabling request.

2. The method of claim 1, wherein the battery disabling device controls the electric vehicle to generate a warning sound and a warning message on an instrument panel when the electric vehicle in which the battery misuse occurs is driven.

3. The method of claim 1, further comprising:
determining that the battery record has been manipulated; and
determining that the battery has been counterfeited or tampered.

4. The method of claim 1, further comprising:
determining that the electric vehicle has been illegally used based on electric vehicle management data acquired from an external server.

5. The method of claim 1, further comprising:
determining that an electric vehicle use contract has been violated.

6. The method of claim 1, further comprising:
issuing a battery NFT on the blockchain based on a battery production specification and a battery identifier, wherein the battery NFT moves to a blockchain wallet of a battery owner.

7. The method of claim 6, further comprising:
linking battery value evaluation data with the battery NFT, wherein the battery value evaluation data is data that affects a battery value.

8. The method of claim 7, further comprising:
storing the battery value evaluation data on the blockchain in different formats.

* * * * *